United States Patent
Xu et al.

(10) Patent No.: US 10,820,237 B2
(45) Date of Patent: Oct. 27, 2020

(54) MULTI-STEP REFERENCE SIGNAL CONFIGURATION AND DETECTION FOR INTERFERENCE MANAGEMENT

(71) Applicant: QUALCOMM Incorporated, San Diego, CA (US)

(72) Inventors: Huilin Xu, San Diego, CA (US); Wanshi Chen, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/573,093

(22) Filed: Sep. 17, 2019

(65) Prior Publication Data

US 2020/0107227 A1    Apr. 2, 2020

Related U.S. Application Data

(60) Provisional application No. 62/738,967, filed on Sep. 28, 2018.

(51) Int. Cl.
*H04W 28/16* (2009.01)
*H04B 17/345* (2015.01)
*H04L 5/14* (2006.01)

(52) U.S. Cl.
CPC .......... *H04W 28/16* (2013.01); *H04B 17/345* (2015.01); *H04L 5/14* (2013.01)

(58) Field of Classification Search
CPC ........ H04W 28/16; H04B 17/345; H04L 5/14; H04L 5/1469; H04L 5/0053; H04L 1/00;

(Continued)

(56) References Cited

U.S. PATENT DOCUMENTS

2010/0182966 A1    7/2010  Kishiyama et al.
2015/0189666 A1*   7/2015  Wang ................ H04W 72/0406
                                                        370/329

(Continued)

OTHER PUBLICATIONS

International Search Report and Written Opinion—PCT/US2019/051717—ISA/EPO—dated Dec. 3, 2019.

(Continued)

*Primary Examiner* — Kyaw Z Soe
(74) *Attorney, Agent, or Firm* — Linda G. Gunderson; Holland & Hart LLP

(57) ABSTRACT

Methods, systems, and devices for wireless communications are described. A core network may organize a set of base stations into a set of cell groups, each cell group including one or more base stations, the cell groups being organized based on potential of each base station to cause interference, by downlink transmission, to reception of uplink transmissions at remote base stations. The core network may identify cell group identifications for each cell group and configure the set of base stations with respective cell group identifications so that signals transmitted from individual base stations of each cell group include the respective cell group identification, and so that remote base stations whose uplink transmissions are interfered with can identify the cell group of base stations causing the interference. The number of base stations in a cell group may be iteratively reduced based on identifying the interference.

30 Claims, 20 Drawing Sheets

(58) Field of Classification Search
CPC ... H04L 5/0048; H04L 5/0073; H04L 27/261; H04J 11/0056
See application file for complete search history.

(56) References Cited

U.S. PATENT DOCUMENTS

| | | | |
|---|---|---|---|
| 2016/0094374 A1 | 3/2016 | Koorapaty et al. | |
| 2016/0197659 A1* | 7/2016 | Yu ...................... | H04J 13/0003 370/335 |
| 2017/0126340 A1* | 5/2017 | Li ...................... | H04W 52/241 |

OTHER PUBLICATIONS

Samsung: "Cross-Link Interference Management based on Coordinated Beamforming", 3GPP TSG RAN WG1 Meeting #89, 3GPP Draft; R1-1708056, vol. RAN WG1, No. Hangzhou; May 15, 2017-May 19, 2017, May 14, 2017 (May 14, 2017), pp. 1-10, XP051273252, Retrieved from the Internet: URL: http://www.3gpp.org/ftp/Meetings_3GPP_SYNC/RAN1/Docs/ [retrieved on May 14, 2017] the whole document.

* cited by examiner

MULTI-STEP REFERENCE SIGNAL CONFIGURATION AND DETECTION FOR INTERFERENCE MANAGEMENT

CROSS REFERENCE

The present application for patent claims the benefit of U.S. Provisional Patent Application No. 62/738,967 by X U et al., entitled "MULTI-STEP REFERENCE SIGNAL CONFIGURATION AND DETECTION FOR INTERFERENCE MANAGEMENT," filed Sep. 28, 2018, assigned to the assignee hereof, which is hereby incorporated by reference in its entirety.

BACKGROUND

The following relates generally to wireless communications, and more specifically to multi-step reference signal configuration and detection for interference management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipment (UE). Accordingly, a first base station may support communications for one or more UEs within and around the edge of a coverage area for the first base station. However, in some cases, a downlink signal from a remote base station far away from the first base station (e.g., several 100 km) may cause a remote interference on uplink signals received at the first base station. Additionally, neighboring base stations or UEs may also cause a local interference (for example, in the form of cross-link interference) on uplink signals received at the first base station. Efficient techniques are desired for managing the remote and local interference.

SUMMARY

The described techniques relate to improved methods, systems, devices, and apparatuses that support multi-step reference signal configuration and detection for interference management. Generally, the described techniques provide for identifying one or more cell group identifiers for respective groups of cells (e.g., base stations, cells on multiple base stations, multiple cells on a same base station, or a combination thereof). The groups of cells may be nested such that some groups of cells are sub-groups of other groups of cells.

In one instance, only a cell group identifier for a highest level of the groups of cells is provided. Wireless devices within the highest group of cells may indicate a corresponding cell group identifier (for the highest group of cells) in a first reference signal. Accordingly, in some cases, a victim device may receive the first reference signal (e.g., along with another signal) and identify that interference is caused by the cell group based on receiving the first reference signal. The victim device may then send a triggering message indicating which cell group is causing the interference. A network controller may receive the triggering message and then assign additional cell group identifiers to sub-groups of the cell group that was indicated as causing interference. Each cell sub-group may transmit a respective second reference signal that conveys their separate cell group identifiers, such that cells causing the interference (e.g., remote or local interference) may be narrowed down to one or more identified cell sub-groups. In some cases, the identified cell sub-groups may further be split into smaller cell sub-groups or individual cells with respective cell group/cell identifiers transmitted on corresponding reference signals to further refine the search for the cells causing the remote interference. Once the responsible cell or cells are identified to a smaller granularity, interference mitigation may be performed to reduce the effect of the interference on affected cells.

The described techniques may be performed by a first wireless device, a second wireless device, and a network controller operating in a time division duplex (TDD) system. In some cases, the first wireless device may be an aggressor cell that is causing remote interference (e.g., or an additional type of interference) on the second wireless device, which may be a victim cell. Accordingly, the network controller may assign or configure the different levels of cell group identifiers to the first wireless device, such that the second wireless device is able to determine which cell group that includes the first wireless device is causing the remote interference. For example, the first wireless device (and any other cells/wireless devices in its cell group) may transmit a reference signal (e.g., remote interference management reference signal (RIM-RS)) that conveys its cell group identifier. If the second wireless device receives or identifies this reference signal, then the second wireless device may transmit the triggering message to the network controller that indicates which cell group is causing the remote interference. The network controller may then further split the cell group including the first wireless device into smaller sub-groups (e.g., down to individual cells in some cases) to enable the second wireless device and network controller to narrow down which specific wireless device is causing the remote interference. The cell group identifiers may be included in corresponding reference signals in implicit indications, explicit indications, or a combination of implicit and explicit indications.

A method of wireless communication at a first wireless device (e.g., an aggressor wireless device) operating in a TDD system is described. The method may include receiving a first cell group identifier from a network controller, the first cell group identifier representing a group of cells which are associated with each other based on a likelihood of each cell in the group of cells to cause interference at one or more remote wireless devices (e.g., victim wireless devices), the first wireless device being associated with a first cell of the group of cells, transmitting a first reference signal that is indicative of the first cell group identifier, receiving, from the network controller and based on the first reference signal being part of an interfering transmission at a remote wireless device, a second cell group identifier representing a sub-group of the group of cells, the sub-group including the first cell, and transmitting one or more reference signals that are indicative of the second cell group identifier.

An apparatus for wireless communication at a first wireless device (e.g., an aggressor wireless device) operating in a TDD system is described. The apparatus may include a processor, memory in electronic communication with the processor, and instructions stored in the memory. The instructions may be executable by the processor to cause the apparatus to receive a first cell group identifier from a network controller, the first cell group identifier representing a group of cells which are associated with each other based on a likelihood of each cell in the group of cells to cause interference at one or more remote wireless devices (e.g., victim wireless devices), the first wireless device being associated with a first cell of the group of cells, transmit a first reference signal that is indicative of the first cell group identifier, receive, from the network controller and based on the first reference signal being part of an interfering transmission at a remote wireless device, a second cell group identifier representing a sub-group of the group of cells, the sub-group including the first cell, and transmit one or more reference signals that are indicative of the second cell group identifier.

Another apparatus for wireless communication at a first wireless device operating in a TDD system is described. The apparatus may include means for receiving a first cell group identifier from a network controller, the first cell group identifier representing a group of cells which are associated with each other based on a likelihood of each cell in the group of cells to cause interference at one or more remote wireless devices (e.g., victim wireless devices), the first wireless device being associated with a first cell of the group of cells, transmitting a first reference signal that is indicative of the first cell group identifier, receiving, from the network controller and based on the first reference signal being part of an interfering transmission at a remote wireless device, a second cell group identifier representing a sub-group of the group of cells, the sub-group including the first cell, and transmitting one or more reference signals that are indicative of the second cell group identifier.

A non-transitory computer-readable medium storing code for wireless communication at a first wireless device (e.g., an aggressor wireless device) operating in a TDD system is described. The code may include instructions executable by a processor to receive a first cell group identifier from a network controller, the first cell group identifier representing a group of cells which are associated with each other based on a likelihood of each cell in the group of cells to cause interference at one or more remote wireless devices (e.g., victim wireless devices), the first wireless device being associated with a first cell of the group of cells, transmit a first reference signal that is indicative of the first cell group identifier, receive, from the network controller and based on the first reference signal being part of an interfering transmission at a remote wireless device, a second cell group identifier representing a sub-group of the group of cells, the sub-group including the first cell, and transmit one or more reference signals that are indicative of the second cell group identifier.

Some examples of the method, apparatuses, and non-transitory computer-readable medium described herein may further include operations, features, means, or instructions for receiving, from the network controller and based on the one or more reference signals being part of an additional interfering transmission at the remote wireless device, one or more additional cell group identifiers representing one or more additional nested sub-groups of the group of cells, with a last cell group identifier representing the first cell.

In some examples of the method, apparatuses, and non-transitory computer-readable medium described herein, the sub-group includes only the first cell.

In some examples of the method, apparatuses, and non-transitory computer-readable medium described herein, transmitting the first reference signal may include operations, features, means, or instructions for including the first cell group identifier in the first reference signal as an explicit indication.

In some examples of the method, apparatuses, and non-transitory computer-readable medium described herein, transmitting the first reference signal may include operations, features, means, or instructions for including the first cell group identifier in the first reference signal as an implicit indication.

In some examples of the method, apparatuses, and non-transitory computer-readable medium described herein, the implicit indication may be through association of one or more reference signal patterns with the first cell group identifier.

In some examples of the method, apparatuses, and non-transitory computer-readable medium described herein, transmitting the first reference signal may include operations, features, means, or instructions for including the first cell group identifier in the first reference signal through a combination of explicit and implicit indications.

In some examples of the method, apparatuses, and non-transitory computer-readable medium described herein, cells of the group of cells may be associated with each other based on a likelihood of each cell in the group of cells to cause interference, by downlink transmission, to reception of uplink transmissions at the one or more remote wireless devices.

In some examples of the method, apparatuses, and non-transitory computer-readable medium described herein, cells of the group of cells may be associated with each other based on a likelihood of each cell in the group of cells to cause cross-link interference with the one or more remote wireless devices.

In some examples of the method, apparatuses, and non-transitory computer-readable medium described herein, the second cell group identifier may be unique among other cell group identifiers associated with other sub-groups of the group of cells.

In some examples of the method, apparatuses, and non-transitory computer-readable medium described herein, the second cell group identifier may be unique among other cell group identifiers associated with other sub-groups at a same sub-group level within the group of cells.

In some examples of the method, apparatuses, and non-transitory computer-readable medium described herein, the second cell group identifier may be unique among other cell group identifiers associated with other sub-groups at any sub-group level within the group of cells.

A method of wireless communication at a first wireless device (e.g., a victim wireless device) operating in a TDD system is described. The method may include identifying that a first transmission from a remote wireless device (e.g., an aggressor wireless device) is causing interference at the first wireless device, the first transmission including a first reference signal, identifying, from the first reference signal, a first cell group identifier which indicates a group of cells which are associated with each other based on a likelihood of each cell in the group of cells to cause interference, the remote wireless device being associated with a first cell of the group of cells, transmitting a triggering message to a network controller to trigger the assignment of a second cell group identifier to a sub-group of the group of cells, the sub-group including the first cell, and receiving, from the remote wireless device, one or more transmissions from the remote wireless device, the one or more transmissions including at least a second reference signal that is indicative of the second cell group identifier.

An apparatus for wireless communication at a first wireless device (e.g., a victim wireless device) operating in a TDD system is described. The apparatus may include a processor, memory in electronic communication with the processor, and instructions stored in the memory. The instructions may be executable by the processor to cause the apparatus to identify that a first transmission from a remote wireless device (e.g., an aggressor wireless device) is causing interference at the first wireless device, the first transmission including a first reference signal, identify, from the first reference signal, a first cell group identifier which indicates a group of cells which are associated with each other based on a likelihood of each cell in the group of cells to cause interference, the remote wireless device being associated with a first cell of the group of cells, transmit a triggering message to a network controller to trigger the assignment of a second cell group identifier to a sub-group of the group of cells, the sub-group including the first cell, and receive, from the remote wireless device, one or more transmissions from the remote wireless device, the one or more transmissions including at least a second reference signal that is indicative of the second cell group identifier.

Another apparatus for wireless communication at a first wireless device (e.g., a victim wireless device) operating in a TDD system is described. The apparatus may include means for identifying that a first transmission from a remote wireless device (e.g., an aggressor wireless device) is causing interference at the first wireless device, the first transmission including a first reference signal, identifying, from the first reference signal, a first cell group identifier which indicates a group of cells which are associated with each other based on a likelihood of each cell in the group of cells to cause interference, the remote wireless device being associated with a first cell of the group of cells, transmitting a triggering message to a network controller to trigger the assignment of a second cell group identifier to a sub-group of the group of cells, the sub-group including the first cell, and receiving, from the remote wireless device, one or more transmissions from the remote wireless device, the one or more transmissions including at least a second reference signal that is indicative of the second cell group identifier.

A non-transitory computer-readable medium storing code for wireless communication at a first wireless device (e.g., a victim wireless device) operating in a TDD system is described. The code may include instructions executable by a processor to identify that a first transmission from a remote wireless device (e.g., an aggressor wireless device) is causing interference at the first wireless device, the first transmission including a first reference signal, identify, from the first reference signal, a first cell group identifier which indicates a group of cells which are associated with each other based on a likelihood of each cell in the group of cells to cause interference, the remote wireless device being associated with a first cell of the group of cells, transmit a triggering message to a network controller to trigger the assignment of at least a second cell group identifier to a sub-group of the group of cells, the sub-group including the first cell, and receive, from the remote wireless device, one or more transmissions from the remote wireless device, the one or more transmissions including at least a second reference signal that is indicative of the second cell group identifier.

Some examples of the method, apparatuses, and non-transitory computer-readable medium described herein may further include operations, features, means, or instructions for determining that the one or more transmissions may be causing interference at the first wireless device, transmitting one or more additional triggering messages to the network controller based on the second transmission being an interfering transmission and receiving one or more additional transmissions from the remote wireless device, each of the one or more additional transmissions including a reference signal indicative of a corresponding additional cell group identifier, the additional cell group identifiers representing one or more additional nested sub-groups of the group of cells.

In some examples of the method, apparatuses, and non-transitory computer-readable medium described herein, a last cell group identifier associated with a last reference signal represents the first cell.

In some examples of the method, apparatuses, and non-transitory computer-readable medium described herein, the sub-group includes only the first cell.

In some examples of the method, apparatuses, and non-transitory computer-readable medium described herein, identifying the first cell group identifier may include operations, features, means, or instructions for receiving the first cell group identifier as an explicit indication in the first reference signal.

In some examples of the method, apparatuses, and non-transitory computer-readable medium described herein, identifying the first cell group identifier may include operations, features, means, or instructions for determining the first cell group identifier from an implicit indication of the first reference signal.

In some examples of the method, apparatuses, and non-transitory computer-readable medium described herein, the implicit indication may be through association of one or more reference signal patterns with the first cell group identifier.

In some examples of the method, apparatuses, and non-transitory computer-readable medium described herein, identifying the first cell group identifier may include operations, features, means, or instructions for determining the first cell group identifier through a combination of explicit and implicit indications in the first reference signal.

In some examples of the method, apparatuses, and non-transitory computer-readable medium described herein, cells of the group of cells may be associated with each other based on a likelihood of each cell in the group of cells to cause interference, by downlink transmission, to reception of uplink transmissions at the first wireless device.

In some examples of the method, apparatuses, and non-transitory computer-readable medium described herein, cells of the group of cells may be associated with each other based on a likelihood of each cell in the group of cells to cause cross-link interference with the first wireless device.

In some examples of the method, apparatuses, and non-transitory computer-readable medium described herein, the second cell group identifier may be unique among other cell group identifiers associated with other sub-groups of the group of cells.

In some examples of the method, apparatuses, and non-transitory computer-readable medium described herein, the second cell group identifier may be unique among other cell group identifiers associated with other sub-groups at a same sub-group level within the group of cells.

In some examples of the method, apparatuses, and non-transitory computer-readable medium described herein, the second cell group identifier may be unique among other cell group identifiers associated with other sub-groups at any sub-group level within the group of cells.

A method of wireless communication at a network controller in communication with a set of wireless devices operating in a TDD system is described. The method may include identifying a group of cells which are associated with each other based on a likelihood of each cell in the group of cells to cause interference at one or more remote wireless devices (e.g., victim wireless devices), transmitting a first cell group identifier to a first wireless device (e.g., an aggressor wireless device) of the set of wireless devices, the first cell group identifier representing the group of cells, the first wireless device being associated with a first cell of the group of cells, receiving a triggering message indicating that a remote wireless device received an interfering transmission that included a first reference signal indicative of the first cell group identifier, and transmitting to the first wireless device and based on receipt of the triggering message, a second cell group identifier representing a sub-group of the group of cells, the sub-group including the first cell.

An apparatus for wireless communication at a network controller in communication with a set of wireless devices operating in a TDD system is described. The apparatus may include a processor, memory in electronic communication with the processor, and instructions stored in the memory. The instructions may be executable by the processor to cause the apparatus to identify a group of cells which are associated with each other based on a likelihood of each cell in the group of cells to cause interference at one or more remote wireless devices (e.g., victim wireless devices), transmit a first cell group identifier to a first wireless device (e.g., an aggressor wireless device) of the set of wireless devices, the first cell group identifier representing the group of cells, the first wireless device being associated with a first cell of the group of cells, receive a triggering message indicating that a remote wireless device received an interfering transmission that included a first reference signal indicative of the first cell group identifier, and transmit to the first wireless device and based on receipt of the triggering message, a second cell group identifier representing a sub-group of the group of cells, the sub-group including the first cell.

Another apparatus for wireless communication at a network controller in communication with a set of wireless devices operating in a TDD system is described. The apparatus may include means for identifying a group of cells which are associated with each other based on a likelihood of each cell in the group of cells to cause interference at one or more remote wireless devices (e.g., victim wireless devices), transmitting a first cell group identifier to a first wireless device (e.g., an aggressor wireless device) of the set of wireless devices, the first cell group identifier representing the group of cells, the first wireless device being associated with a first cell of the group of cells, receiving a triggering message indicating that a remote wireless device received an interfering transmission that included a first reference signal indicative of the first cell group identifier, and transmitting to the first wireless device and based on receipt of the triggering message, a second cell group identifier representing a sub-group of the group of cells, the sub-group including the first cell.

A non-transitory computer-readable medium storing code for wireless communication at a network controller in communication with a set of wireless devices operating in a TDD system is described. The code may include instructions executable by a processor to identify a group of cells which are associated with each other based on a likelihood of each cell in the group of cells to cause interference at one or more remote wireless devices (e.g., victim wireless devices), transmit a first cell group identifier to a first wireless device (e.g., an aggressor wireless device) of the set of wireless devices, the first cell group identifier representing the group of cells, the first wireless device being associated with a first cell of the group of cells, receive a triggering message indicating that a remote wireless device received an interfering transmission that included a first reference signal indicative of the first cell group identifier, and transmit to the first wireless device and based on receipt of the triggering message, a second cell group identifier representing a sub-group of the group of cells, the sub-group including the first cell.

Some examples of the method, apparatuses, and non-transitory computer-readable medium described herein may further include operations, features, means, or instructions for receiving one or more additional triggering messages indicating that the remote wireless device received additional interfering transmissions that included either a second reference signal indicative of the second cell group identifier, or additional reference signals indicative of additional cell group identifiers associated with one or more nested sub-groups of the group of cells.

Some examples of the method, apparatuses, and non-transitory computer-readable medium described herein may further include operations, features, means, or instructions for transmitting one or more additional cell group identifiers to the first wireless device, based on receiving the one or more additional triggering messages, the one or more additional cell group identifiers representing one or more additional nested sub-groups of the group of cells, with a last cell group identifier representing the first cell.

Some examples of the method, apparatuses, and non-transitory computer-readable medium described herein may further include operations, features, means, or instructions for identifying the sub-group, where the sub-group includes only the first cell.

In some examples of the method, apparatuses, and non-transitory computer-readable medium described herein, identifying the group of cells may include operations, features, means, or instructions for identifying cells which may be associated with each other based on a likelihood of each cell in the group of cells to cause interference, by downlink transmission, to reception of uplink transmissions at the one or more remote wireless devices.

In some examples of the method, apparatuses, and non-transitory computer-readable medium described herein, identifying the group of cells may include operations, features, means, or instructions for identifying cells which may be associated with each other based on a likelihood of each cell in the group of cells to cause cross-link interference with the one or more remote wireless devices.

In some examples of the method, apparatuses, and non-transitory computer-readable medium described herein, the second cell group identifier may be unique among other cell group identifiers associated with other sub-groups of the group of cells.

In some examples of the method, apparatuses, and non-transitory computer-readable medium described herein, the second cell group identifier may be unique among other cell group identifiers associated with other sub-groups at a same sub-group level within the group of cells.

In some examples of the method, apparatuses, and non-transitory computer-readable medium described herein, the second cell group identifier may be unique among other cell group identifiers associated with other sub-groups at any sub-group level within the group of cells.

DETAILED DESCRIPTION

Figure 1:
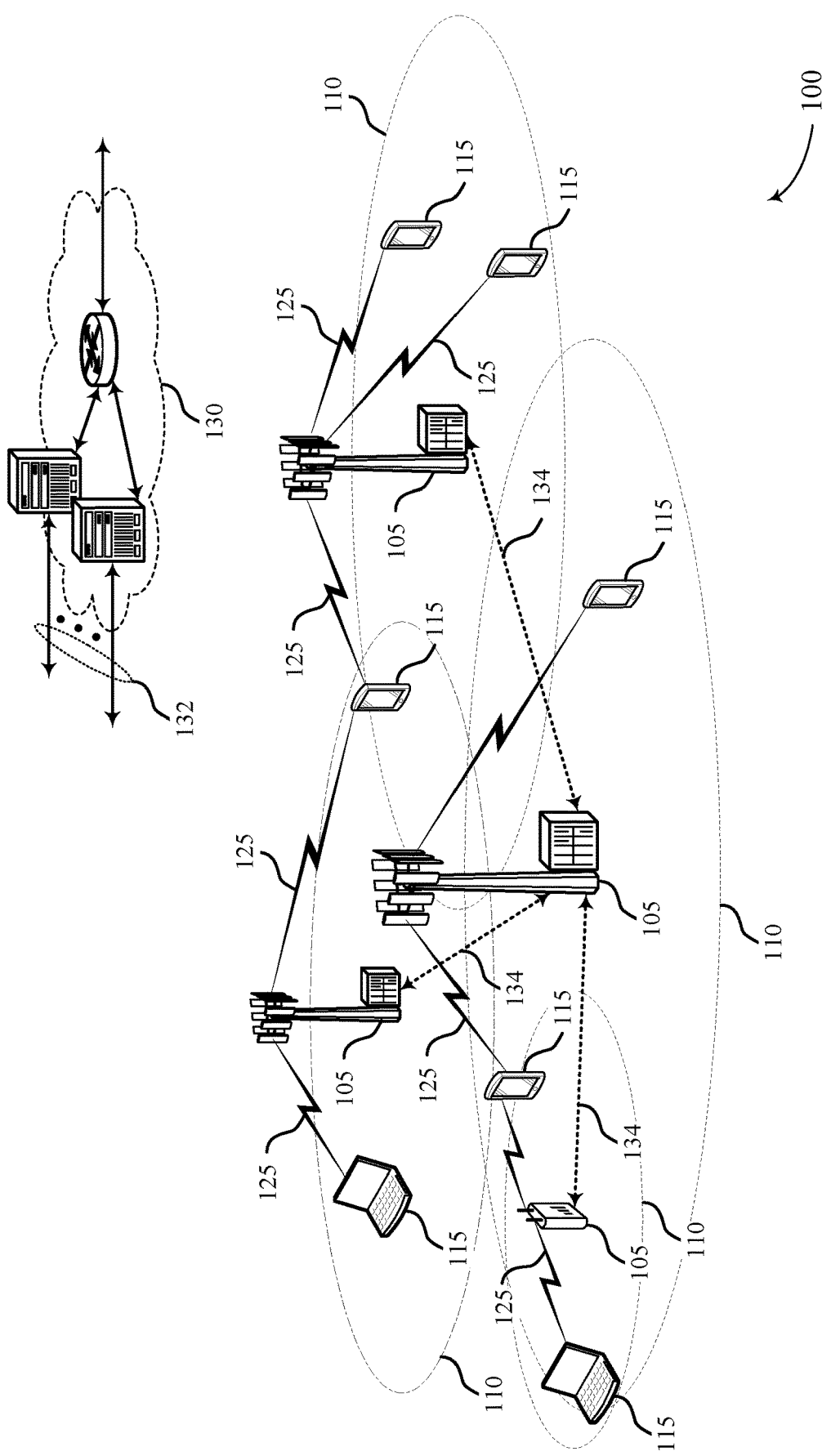
FIG. 1 illustrates an example of a system for wireless communications that supports multi-step reference signal configuration and detection for interference management in accordance with aspects of the present disclosure.

In some wireless communications systems, a first base station, a second base station, and a network controller may operate in a time division duplex (TDD) system. In some examples, the first base station may be an aggressor base station (e.g., aggressor cell) that is causing remote interference on the second base station, which may be a victim base station (e.g., victim cell). Accordingly, the network controller may assign or configure different levels of cell group identifiers to the aggressor base station and associated base stations, such that the victim base station is able to determine which cell group (e.g., that includes the aggressor base station) is causing the remote interference. For example, the aggressor base station (e.g., and any other cells/wireless devices in its cell group) may transmit a reference signal (e.g., remote interference management reference signal (RIM-RS)) that conveys its cell group identifier. If the victim base station receives or identifies this reference signal, then the victim base station may transmit a triggering message to the network controller that indicates which cell group is causing the interference. The network controller may then further split the cell group including the aggressor base station into smaller sub-groups (e.g., down to individual cells in some cases) to enable the victim base station to identify the aggressor base station with more precision. The cell group identifiers may be included in corresponding reference signals in implicit indications, explicit indications, or a combination of implicit and explicit indications.

As described herein, a base station may experience remote interference due to a downlink transmission from another base station in a wireless communications system. A base station experiencing interference from another base station may be referred to as a victim base station, while a base station causing the interference to the victim base station may be referred to as an aggressor base station or a remote base station with respect to the victim base station. In other examples, a victim base station may be referred to as a remote base station with respect to the aggressor base station. In some examples, the aggressor base station and the victim base station may both communicate using TDD, and the TDD configuration of the base stations may be synchronized. Generally, downlink transmissions from an aggressor base station should only affect devices within a coverage area of the aggressor base station. However, due to various geographical and/or atmospheric conditions, some downlink transmissions from an aggressor base station may travel great distances (e.g., 100 km) and affect a victim base station. Due to the distance between the two base stations, a downlink transmission from the aggressor base station may be delayed by a time period, and the downlink transmission may overlap and interfere with a portion of an uplink transmission to be received by the victim base station. Such remote interference may affect communications between the victim base station and one or more user equipment (UEs).

In some cases, an aggressor base station may be identifiable to a victim base station based at least in part on a unique identifier, which the victim base station may use to differentiate between other aggressor base stations. For example, a victim base station may receive, from an aggressor base station, an identifier, which may be a physical cell identifier, a cell global identifier (CGI), or any other identifier that may be unique to the aggressor base station. Upon receiving the identifier, the victim base station may transmit, to the aggressor base station, a message indicating that transmissions from the aggressor base station are causing interference at the victim base station. The message may be transmitted explicitly or implicitly over the air (OTA) or through a core network to request the aggressor base station to mitigate the interference (e.g., delay transmission, reduce transmit power, etc.).

In some cases, multiple aggressor base stations causing a degree of interference to a victim base station may exist. Assigning different unique identifiers to each aggressor base station may be impracticable due to one or more factors. An example factor may be that a group of aggressor base stations may generate significant interference to the victim base station, but not every aggressor base station's interference may be strong enough for its unique identifier to be reliably received (e.g., detected) at the victim base station. Another example factor may be that there are too many aggressor base stations (e.g., a number of aggressor base stations above a threshold count), but not enough available unique identifiers to be assigned for each aggressor base station. Additionally or alternatively, another factor may be that there are too many aggressor base stations, which may result in an undesirable latency related to the victim base station receiving a unique identifier from each aggressor base station.

To reduce latency and improve efficiency related to mitigating interference, two or more aggressor base stations may be grouped into a cell group, which may be assigned a single unique identifier. A quantity of aggressor base stations may be grouped into a cell group based at least in part on one or more factors. By example, a factor may include, but is not limited to, whether the quantity of aggressor base stations are indoor or outdoor cells, small or large cells, cells equipped with high elevation or short elevation radiation towers, a geographic location of each of the aggressor base stations (e.g., coastal terrain, mountain terrain), or an antenna orientation (e.g., antenna(s) orientation(s) of the aggressor base stations), etc. The unique identifier may be transmitted by each aggressor base station in the cell group using a same signaling. For example, the signaling may be a synchronization signal, a system information block (SIB), or a reference signal (e.g., cell-specific reference signal). A cell group may include one or more levels of cell sub-groups as well, each having a unique or semi-unique identifier. A cell group structure may include one or more levels. For example, a first level cell group structure may include a single cell group, a second level cell group structure may include a cell group and a cell sub-group within the cell group, a third level cell group structure may include a cell group, a cell sub-group within the cell group, and a second cell sub-group within the cell sub-group that is within the cell group.

Aspects of the disclosure are initially described in the context of a wireless communications system. An example of a remote interference, a cell grouping configuration, an additional wireless communications system, a multi-step reference signal detection, and a process flow are then provided to illustrate additional aspects of the disclosure. Aspects of the disclosure are further illustrated by and described with reference to apparatus diagrams, system diagrams, and flowcharts that relate to multi-step reference signal configuration and detection for interference management.

FIG. 1 illustrates an example of a wireless communications system 100 that supports multi-step reference signal configuration and detection for interference management in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplex (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As mentioned above, a base station 105 may communicate with one or more UEs 115 within a respective coverage area 110. In some aspects, downlink transmissions from one base station 105 may only be detectable by UEs within and around the edge of a respective coverage area 110. In other aspects, however, downlink transmissions from a base station 105 may be detectable beyond the coverage area 110 of the base station 105. For instance, the downlink transmissions may be detectable at a distance much larger than a coverage range (e.g., several 100 kilometers) due to reflection by mountains, ocean surface, or clouds, due to atmospheric ducting, etc. In such aspects, downlink transmissions from the base station 105 may interfere with communications between another base station 105 and one or more UEs 115. Such interference may be referred to as remote interference. Additionally, local interference may be caused by neighboring wireless devices. As an example, cross-link interference may be caused by neighboring UEs or base stations.

Figure 2:
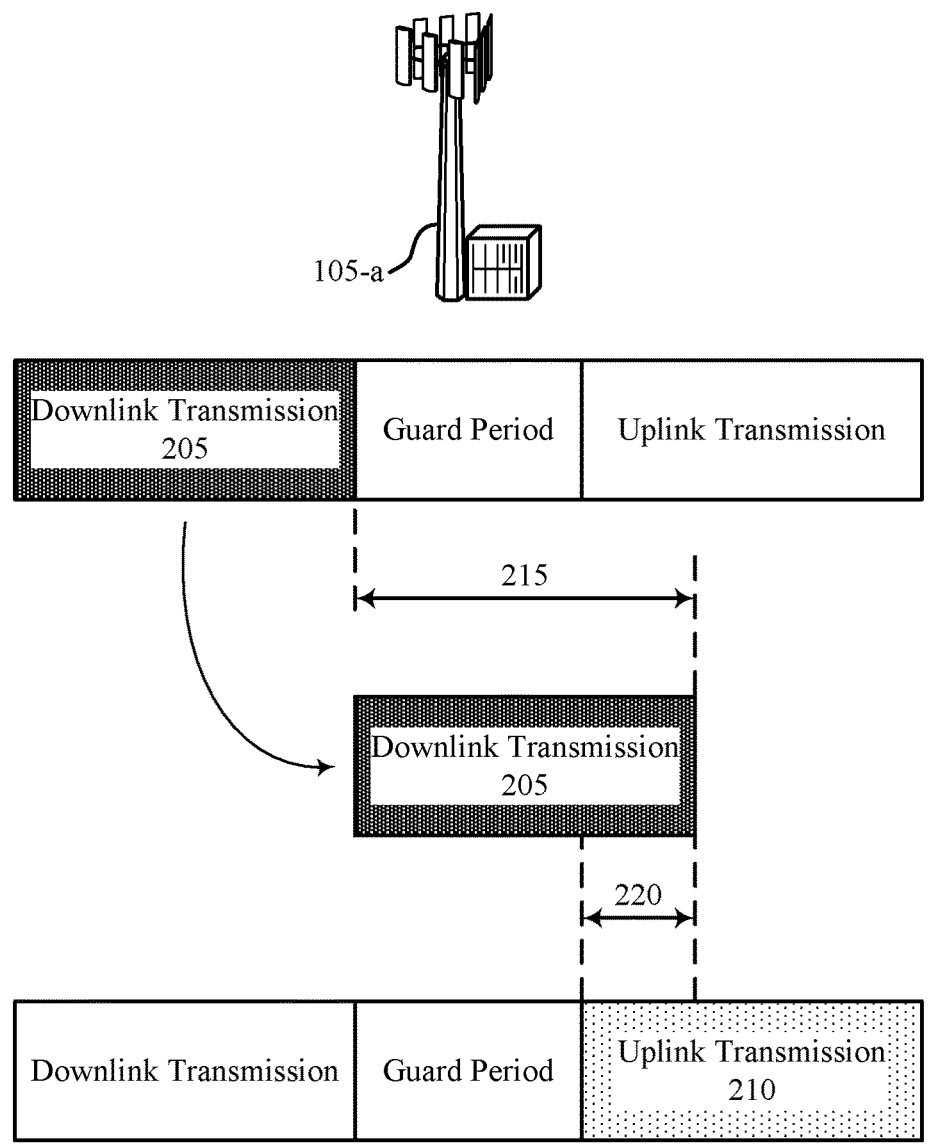
FIG. 2 illustrates an example of a remote interference experienced by a base station due to a downlink transmission from a base station in a wireless communications system.

FIG. 2 illustrates an example of remote interference 200 experienced by a base station 105-b due to a downlink transmission 205 from a base station 105-a in a wireless communications system. In some examples, the remote interference experienced by base station 105-b due to the downlink transmission 205 from base station 105-a may implement aspects of the wireless communications system 100. A base station experiencing interference from another base station may be referred to herein as a victim base station, while a base station causing the interference to the victim base station may be referred to herein as an aggressor base station or a remote base station. For example, base station 105-b may be referred to as the victim base station and base station 105-a may be referred to as the aggressor base station.

In the example of FIG. 2, base station 105-a and base station 105-b may communicate using a TDD configuration, and the TDD configuration of base station 105-a and base station 105-b may be synchronized. Due to the distance between base station 105-a and base station 105-b, however, a downlink transmission 205 from base station 105-a may be delayed by a time period 215, and downlink transmission 205 may overlap and interfere with a portion 220 of uplink transmission 210 to be received by base station 105-b. Such remote interference may hinder communications between base station 105-b and one or more UEs 115 in communication with base station 105-b. For instance, base station 105-b may be unable to receive uplink data from a UE 115, or a UE 115 may be unable to synchronize with base station 105-b using a random access procedure. Further, if base station 105-b is impacted by similar interference from other base stations 105 (e.g., in addition to base station 105-a), base station 105-b may experience very low throughput.

Additionally, in a TDD system, a wireless channel may be reciprocal between the transmitter and the receiver. As such, both cells (e.g., on the receiver and on the transmitter) may receive interference from each other. In some cases, the interference may be asymmetric such that one cell may receive stronger interference than the other cell. As described herein, efficient techniques are provided for managing remote interference.

Figure 3:
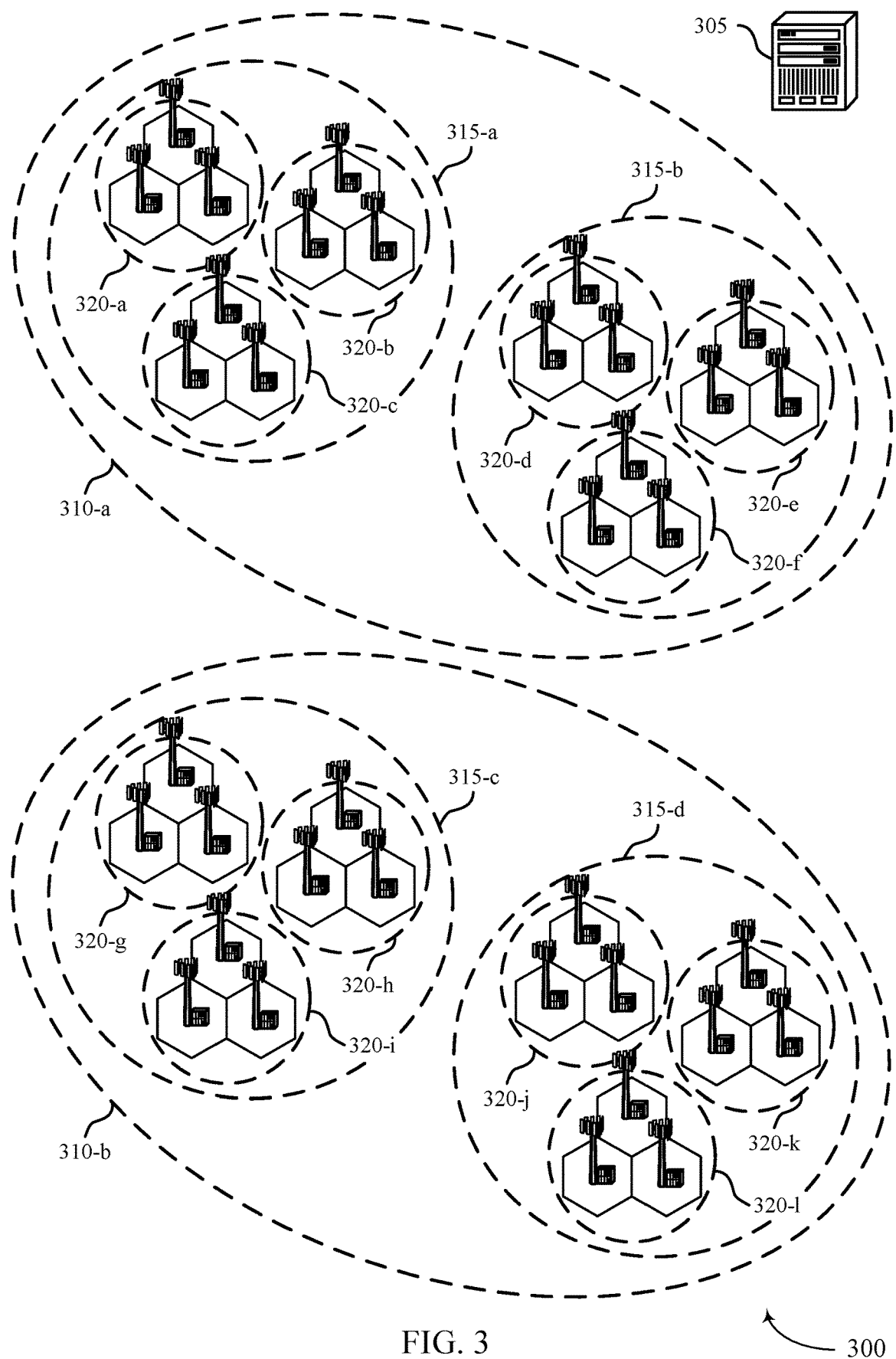
FIG. 3 illustrates an example of a cell grouping configuration that supports multi-step reference signal configuration and detection for interference management in accordance with aspects of the present disclosure.

FIG. 3 illustrates an example of a cell grouping configuration 300 that supports multi-step reference signal configuration and detection for interference management in accordance with aspects of the present disclosure. In some examples, cell grouping configuration 300 may implement aspects of wireless communications system 100. For example, cell grouping configuration 300 may support a remote interference management scheme to mitigate problems related to interference between multiple base stations. A base station experiencing interference from another base station may be referred to herein as a victim base station, while a base station causing the interference to the victim base station may be referred to herein as an aggressor base station or a remote base station.

An aggressor base station may be identifiable to a victim base station based at least in part on a unique identifier, which the victim base station may use to differentiate between other aggressor base stations. For example, a victim base station may receive, from an aggressor base station, an identifier (e.g., RIM-RS), which may be a physical cell identifier, a CGI, or any other identifier that may be unique to the aggressor base station. Upon receiving the identifier, the victim base station may transmit, to the aggressor base station or a network controller 305, a message indicating that transmissions from the aggressor base station are causing interference at the victim base station. The message may be transmitted explicitly or implicitly OTA or through the network controller 305 to request the aggressor base station to mitigate the interference (e.g., delay transmission, reduce transmit power). For example, the network controller 305 may communicate through a core network as described herein with reference to FIG. 1 to indicate the message and request the interference mitigation.

In some cases, multiple aggressor base stations causing a degree of interference to a victim base station may exist. Assigning different unique identifiers to each aggressor base station may be impracticable due to one or more factors. For example, a group of aggressor base stations may generate significant interference to the victim base station, but not every aggressor base station's interference may be strong enough for its unique identifier to be reliably received (e.g., detected) at the victim base station. Another example may include that there are too many aggressor base stations in the wireless communications system (e.g., a number of aggressor base stations above a threshold count), but not enough available unique identifiers to be assigned for each aggressor base station. Additionally or alternatively, there may be too many aggressor base stations in the wireless communications system, which may result in an undesirable latency related to the victim base station receiving a unique identifier from each aggressor base station.

To reduce latency and improve efficiency related to mitigating interference in the wireless communications system, two or more aggressor base stations may be grouped into a cell group, which may be assigned a single unique identifier. A quantity of aggressor base stations may be grouped into a cell group based at least in part on one or more factors. By example, a factor may include, but is not limited to, whether the quantity of aggressor base stations are indoor or outdoor cells, small or large cells, cells equipped with high or low radiation towers, a geographic location of each of the aggressor base stations (e.g., coastal terrain, mountain terrain), or an antenna orientation (e.g., antenna(s) orientation (s) of the aggressor base stations), etc. The unique identifier may be transmitted by each aggressor base station in the cell group using a same signaling. In some examples, the signaling may be dedicated signaling. For example, the signaling may be a synchronization signal, a SIB, or a reference signal (e.g., cell-specific reference signal).

Additionally or alternatively, multiple victim base stations may be grouped into a cell group. For example, when a channel between aggressor base stations and victim base stations is bi-directional, victim base stations may transmit OTA signals to the aggressor base stations to indicate interference from the aggressor base stations. A group of victim base stations may be impacted by the aggressor base stations and therefore transmit the same information to the aggressor base stations. In some cases, when both aggressor base stations and victim base stations are transmitting downlink signals, the victim base stations may behave as interference sources to the aggressor base stations. Therefore, the aggressor base stations may prefer to be aware of the group of victim base stations causing interference to the aggressor base station(s). Although, the remote interference management related to cell grouping is described with reference to aggressor base stations, the same remote interference management may apply to cell grouping of victim base stations.

A quantity of base stations may be formed into a cell group according to a cell grouping scheme described herein. The cell grouping scheme may result in a cell group having a unique identifier and a quantity of aggressor base stations that may generate a degree of interference to at least one victim base station, or a quantity of victim base stations that may generate a degree of interference to at least one aggressor base station. In some examples, a network controller 305 may organize the quantity of base stations into one or more cell groups according to the cell grouping scheme. For example, the network controller 305 may organize a first cell group 310-*a* having a first set of base stations and a second cell group 310-*b* having a second set of base stations based on a potential of each base station in the first set of base stations and in the second set of base stations to cause interference, by downlink transmission, to reception of uplink transmissions at a victim base station.

The first cell group 310-*a*, the second cell group 310-*b*, or both may be organized (e.g., configured, formed) by the network controller 305, for example, during network deployment or network optimization of the wireless communications system 300. The organization of the first cell group 310-*a*, the second cell group 310-*b*, or both may be performed manually, semi-autonomously, or autonomously by the network controller 305.

In an example, the network controller 305 may organize the first cell group 310-*a* having the first set of base stations based on whether the base stations in the first set of base station are associated with indoor or outdoor cells. In another example, the network controller 305 may organize the first set of base stations into the first cell group 310-*a* based on whether the first set of base stations are associated with small or large cells. For example, each base station of the first set may be a macro cell or a small cell, or a combination thereof. A macro cell generally covers a relatively large geographic area (e.g., several kilometers in radius). A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. Although, the cell grouping scheme is described with reference to cell type (e.g., indoor/outdoor cell) or cell size (e.g., macro cell, small cell), the network controller 305 may employ other techniques for organizing the first cell group 310-*a*.

In an example, the network controller 305 may organize the second cell group 310-*b* having the second set of base stations based on whether the base stations in the second set of base stations are high radiation towers or low radiation towers. For example, a high radiation tower may have a larger transmission footprint (e.g., a couple of 100 km) compared to a low radiation tower. In another example, the network controller 305 may organize the second set of base stations into the second cell group 310-*b* based on a geographic location of cells associated with the second set of base stations. For example, each base station of the second set may be within a threshold distance (e.g., geographic area) from each other. Although, the cell grouping scheme is described with reference to radiation tower size and/or geographic locations, the network controller 305 may employ other techniques for organizing the second cell group 310-b.

Additionally or alternatively, the network controller 305 may organize the first cell group 310-a and/or the second cell group 310-b based on an antenna orientation of the corresponding set of base stations. For example, an antenna orientation of the base stations in either set of base stations may be in a same direction or within a threshold degree (e.g., $-\theta \leq \theta \leq +\theta$) compared to each other.

As part of the cell group scheme, the network controller 305 may identify and assign cell group identifications, for each cell group, which may be a unique identifier for each of the first cell group 310-a and the second cell group 310-b. Each cell group 310 may be uniquely identifiable by the victim base station. For example, the network controller 305 may configure each base station in a corresponding cell group 310 with respective cell group identifications so that signals transmitted from individual base stations of each corresponding cell group 310 include the respective cell group identification, and so that the victim base station whose uplink transmissions are interfered with can identify the corresponding cell group 310 of base stations causing the interference. For example, a first base station associated with the first cell group 310-a may receive an indication of the cell group identification from the network controller 305. The cell group identification may represent the first cell group 310-a in which the first base station is organized based on potential of each base station in the first cell group 310-a to cause interference, by downlink transmission, to reception of uplink transmissions at the victim base station. The first base station of the first cell group 310-a may include the cell group identification in downlink transmissions within a reference signal. For example, the reference signal may be a synchronization signal, a SIB, or other type of reference signal (e.g., cell-specific reference signal).

The victim base station may identify that a downlink transmission from a remote base station is interfering with reception of uplink transmissions at the victim base station. For example, the victim base station may identify that a downlink transmission from the first base station of the first cell group 310-a (or a second base station of the second cell group 310-b) is interfering with reception of uplink transmissions at the victim base station. The victim base station may, in some examples, be provided with a list of the cell group identifications (e.g., unique cell group identifiers) by the network controller 305. Upon receiving a cell group identification from a corresponding base station in either cell group 310, the victim base station may parse the list for a matching cell group identification to identify a corresponding cell group of the corresponding base station. The victim base station may detect the cell group identification in the downlink transmission, the cell group identification indicating a cell group in which the remote base station (e.g., the first base station of the first cell group 310-a) is organized. Upon detecting the cell group identification, the victim base station may transmit a message (e.g., a triggering message) to the network controller 305 an indication that the transmission from the cell group is causing interference at the victim base station. Additionally or alternatively, the victim base station may transmit the message indicating that the transmission from the cell group is causing interference at the victim base station to the remote base station (e.g., the first base station in the first cell group 310-a causing the interference).

In an example of victim base station grouping, the victim base station may receive an indication of an additional cell group identification from the network controller 305. The additional cell group identification may represent an additional cell group in which the victim base station is organized based on potential of other base stations in the additional cell group to receive interference (e.g., an interference potential), by downlink transmission, to reception of uplink transmissions at the victim base station. In these cases, the victim base station may provide the additional cell group identification in the message transmitted to the network controller 305 and/or the remote base station (e.g., the first base station of the first cell group 310-a). As such, the network controller 305 and/or remote base station may be aware of potential interference from the victim base station and the other base stations in the additional cell group.

The remote base station may receive the message (e.g., directly or through the network controller 305) and transmit to one or more other base stations in its cell group indicating to the one or more other base stations that transmissions from the cell group are causing interference to reception of uplink transmissions at the remote base stations. As a result, the base stations of the first cell group 310-a may eliminate the interference provided to the victim base station, for example, by delaying transmission, reducing transmit power, etc. Although, the interference mitigation is described with reference to the first cell group 310-a, similar or equal interference mitigation may be employed by the second cell group 310-b.

In some cases, the network controller 305 may organize a quantity of base stations into one or more cell sub-groups of a cell group according to a cell grouping scheme described herein. For example, the network controller 305 may organize the first cell group 310-a having a first cell sub-group 315-a and a second cell sub-group 315-b and may organize the second cell group 305-b having a third cell sub-group 315-c and a fourth cell sub-group 315-d. This procedure may continue in each sub-group by further dividing each sub-group into smaller sub-groups. For example, the first cell sub-group 315-a may be divided into smaller cell sub-groups 320-a, 320-b, and 320-c; the second cell sub-group 315-b may be divided into smaller cell sub-groups 320-d, 320-e, and 320-f; cell sub-group 315-c may be divided into smaller cell sub-groups 320-g, 320-h, and 320-i; and cell sub-group 315-d may be divided into smaller cell sub-groups 320-j, 320-k, and 320-l. Each cell sub-group 315 and smaller cell sub-group 320 may be organized based on the potential of each base station in the cell sub-group 315 or smaller cell sub-group 320 to cause interference, by downlink transmission, to reception of uplink transmissions at a victim base station, which may be an example of the corresponding device described with reference to FIGS. 1 and 2. As shown, there can be multiple (e.g., 1, 2, or >2) levels of cell grouping. For example, if cell group 310 contains a third cell sub-group 315, the cell group 310 is still a two-level cell group structure, but with three cell sub-groups 315. However, if the cell sub-group 315 is further divided into additional smaller cell sub-groups 320, then the cell group 310 would be a three-level cell group structure.

The network controller 305 may organize the corresponding base stations into the first cell sub-group 315-a and the second cell sub-group 315-b (e.g., and into each of the smaller cell sub-groups 320) based on one or more factors as described herein. For example, a factor may include, but is not limited to, whether the quantity of aggressor base stations are indoor or outdoor cells, small or large cells, cells equipped with high or low radiation towers, a geographic location of each of the aggressor base stations (e.g., coastal terrain, mountain terrain), or an antenna orientation (e.g., antenna(s) orientation(s) of the aggressor base stations), etc. The unique identifier may be transmitted by each aggressor base station in the cell group using a same reference signaling. For example, the signaling may be a synchronization signal, a SIB, or another type of reference signal (e.g., cell-specific reference signal).

In some cases, the network controller 305 may identify and assign each cell group 310 a unique identifier (e.g., cell group $ID_A$ and $ID_B$). Following, the network controller 305 may identify cell sub-group identifications for each cell sub-group 315 and each smaller cell sub-group 320. For example, the network controller 305 may identify and assign the first cell sub-group 315-a a unique identifier (e.g., cell group $ID_{A1}$) and the second cell sub-group 315-b another unique identifier (e.g., cell group $ID_{A2}$) different from the first cell sub-group 315-a. Additionally, the network controller 305 may identify assign each smaller cell group 320 with unique identifiers (e.g., cell group $ID_{A11}$ for smaller cell sub-group 320-a, cell group $ID_{A12}$ for smaller cell sub-group 320-b, cell group $ID_{A13}$ for smaller cell sub-group 320-c, etc.). As such, besides an identifier on a top cell group level, cells in a cell sub-group may be assigned with a same identifier on a cell sub-group level, which can be detected separately from the top level identifier from separately transmitted signals from the cell. Additionally or alternatively, each identifier may be unique at least among a cell sub-group within a higher level group. The identifier may also be unique across all cell groups on a same level or across all cell groups on all levels. The network controller 305 may determine the uniqueness of the identifiers by a use case.

Upon assigning the cell sub-group identifications, the network controller 305 may configure the one or more base stations in each cell group 310 with respective cell group identifications and cell sub-group identifications. Each corresponding base station in a first cell sub-group 315 and each corresponding base station in a second cell sub-group 315 may be given the unique identifier of the cell group 310 (e.g., cell group $ID_A$) and the associated unique identifier for their cell sub-group (e.g., cell group $ID_{A1}$ or cell group $ID_{A2}$).

Additionally, or alternatively, each corresponding base station may have its own unique identifier. Thereby, the wireless communications system may support multi-level identifiers in addition to multi-level cell groups. That is, each base station of a first smaller cell sub-group 320-a and each base station of a second smaller cell sub-group 320-b may have its own unique identifier. For example, within the first smaller cell sub-group, a first base station may have a first unique identifier (e.g., ID of the first base station+smaller cell sub-group $ID_{A11}$), a second base station may have a second unique identifier (e.g., ID of the second base station+smaller cell sub-group $ID_{A12}$), and a third base station may have a third unique identifier (e.g., ID of the third base station+smaller cell sub-group $ID_{A13}$). Within the second smaller cell sub-group 320-b, a fourth base station may have a fourth unique identifier (e.g., ID of the fourth+smaller cell sub-group $ID_{A21}$), a fifth base station may have a fifth unique identifier (e.g., ID of the fifth base station+smaller cell sub-group $ID_{A22}$), and a sixth base station may have a sixth unique identifier (e.g., ID of the sixth base station+smaller cell sub-group $ID_{A23}$).

Depending on the remote interference management procedure, a group of cells may be called victim cells or aggressor cells (e.g., victim base stations or aggressor base stations). A base station that includes one of the cells causing the remote interference may transmit a signal (e.g., RIM-RS) that conveys the cell group identifier that is assigned to the cell group which the cell belongs to. At the victim base station, the victim base station may detect the cell group identification in a downlink transmission, the cell group identification indicating the cell group in which a remote base station is organized based on potential of each base station in the cell group to cause the remote interference, by downlink transmission, to reception of uplink transmissions at the victim base station. For example, the victim base station may receive a downlink transmission from a base station in smaller cell sub-group 320-a and identify that the downlink transmission is interfering with reception of uplink transmissions at the at the victim base station.

The victim base station 105-d may detect the cell group identification of smaller cell sub-group 320-a. For example, the victim base station may identify the unique identifier (e.g., cell group $ID_{A11}$) of cell group 320-a. The identifiers may be indicated in a signal called a reference signal (e.g., in interference management systems). The identifier can be explicitly conveyed by the reference signal, or it can be implicitly represented by reference signal patterns (i.e., different combinations of resources allocated to the reference signal through time resources, frequency resources, code division multiplex (CDM) resources, or a combination thereof), or part of the identifier is explicitly conveyed and part of the identifier is implicitly conveyed.

In some cases, the victim base station may receive an indication of additional cell group identifications from the network controller 305, the additional cell group identification representing an additional cell group (e.g., cell sub-group 315 or smaller cell sub-groups 320) in which a single base station is organized. For example, the additional cell group identification may include a unique identifier (e.g., cell group $ID_{A1}$) of the cell sub-group 315 and/or smaller cell sub-group 320. Upon identifying the unique identifier of the cell group 310, the cell sub-group 315, and/or the smaller cell sub-group 320, the victim base station may transmit a message to the base station or network controller 305, the message including an indication that transmissions from the cell group cell group 310, the cell sub-group 315, and/or the smaller cell sub-group 320 are causing interference at the victim base station.

In some examples, detecting the cell group identification, detecting the cell sub-group identification, and detecting smaller cell sub-group may occur in descending order based on indications from the network controller. For example, the victim base station may detect the cell group identification (e.g., of cell group 310-a) before detecting the cell sub-group identification (e.g., cell sub-group 315-a) and before detecting the smaller cell sub-group identification (e.g., smaller cell sub-group 320-a). The message transmitted to the base station and/or network controller 305 may include an indication that transmissions from the cell group 310, the cell sub-group 315, and/or the smaller cell sub-group 320 are causing interference at the victim base station. Supporting multi-level identifiers in addition to multi-level grouping may result in an improved success rate for mitigating interference in a wireless communications system having multiple interfering base stations, may decrease false alarm rates, lower complexity, etc.

Figure 4:
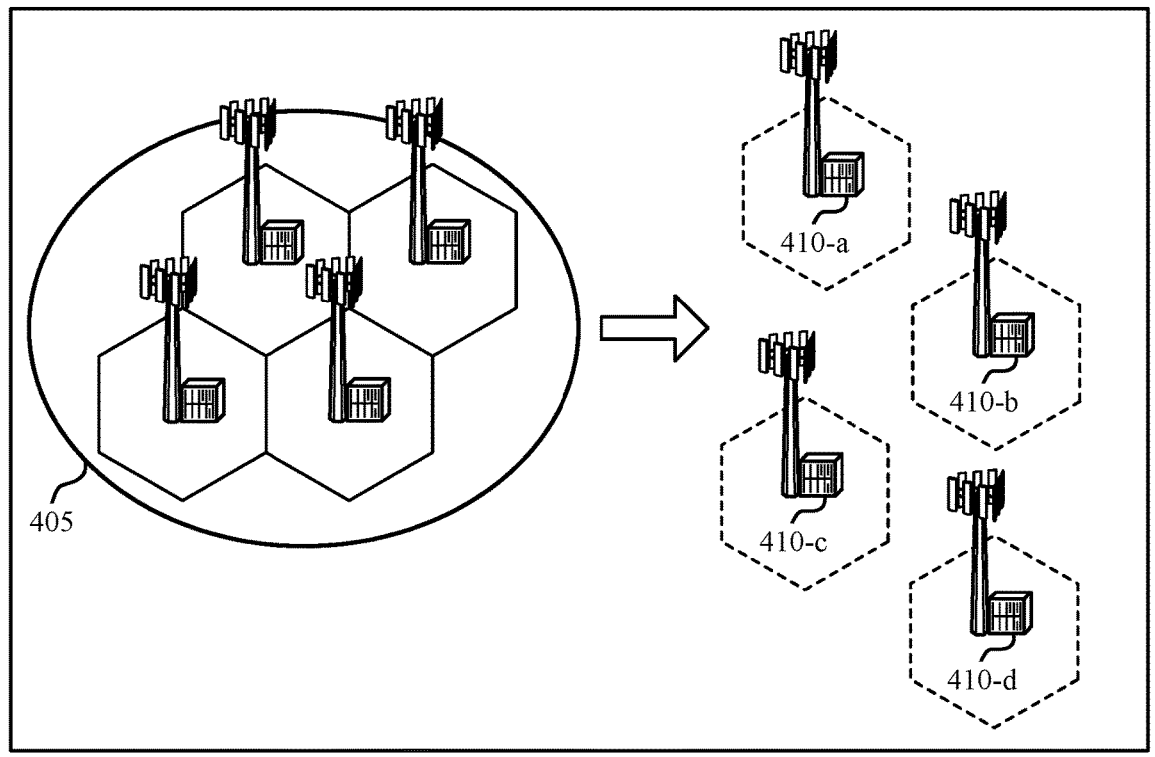
FIG. 4 illustrates an example of a wireless communications system that supports multi-step reference signal configuration and detection for interference management in accordance with aspects of the present disclosure.
Figure 4:
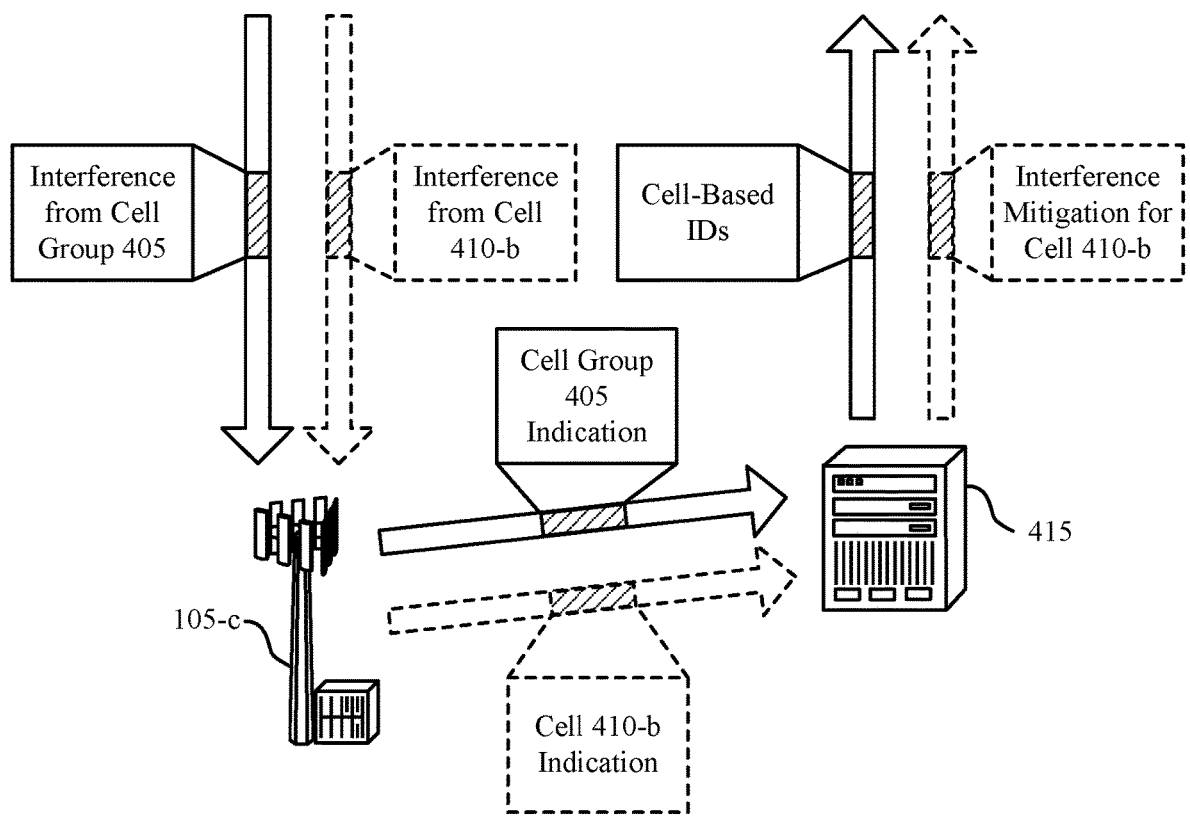

FIG. 4 illustrates an example of a wireless communications system 400 that supports multi-step reference signal configuration and detection for interference management in accordance with aspects of the present disclosure. In some examples, wireless communications system 400 may implement aspects of wireless communications system 100. Wireless communications system may include one or more cells (e.g., base stations, individual cells on separate base stations, separate cells on a same base station, or a combination thereof) that cause remote interference on a victim base station 105-c (e.g., a victim cell) a far distance away. Additionally, a network controller 415 may be included in wireless communications system 400 to coordinate identification of the one or more cells to determine the source of the remote interference, where network controller 415 may be part of the core network as described herein with reference to FIGS. 1-3.

As described herein, an aggressor cell group (e.g., cell group that causes remote interference on victim base station 105-c) may be identified if a cell sends a reference signal (e.g., RIM-RS) that conveys a cell group identification assigned to the aggressor cell group and victim base station 105-c (e.g., a wireless device or cell) in the network detects the reference signal and obtains the cell group identification. Based on the aggressor cell group being able to be identified through the reference signal, a two-step reference signal detection for aggressor cell identification may be used.

If some conditions are met (e.g., an aggressor cell detects it may be causing remote interference, a network controller detects remote interference, etc.), a group of cells may be initially assigned a unique cell group identification 405. Accordingly, when cells in the cell group transmit a reference signal, the unique cell group identification 405 may be conveyed by the reference signal transmitted by these cells. Additionally, the network controller 415 may configure multiple cell groups to transmit reference signals that convey their respective cell group identifications.

In some cases, victim base station 105-c (e.g., a device in the network) may detect a reference signal associated with the unique cell group identification 405. By detecting the reference signal containing the unique cell group identification 405, victim base station 105-c may determine that at least one cell in the cell group is an aggressor base station to itself. Victim base station 105-c may then indicate to network controller 415 that the reference signal with unique cell group identification 405 has been detected by victim base station 105-c. Based on this indication, network controller 415 may then configure a unique cell identification for each cell in the cell group. For example, a first cell in the cell group may be assigned a cell identification 410-a, a second cell in the cell group may be assigned a cell identification 410-b, a third cell in the cell group may be assigned a cell identification 410-c, and a fourth cell in the cell group may be assigned a cell identification 410-d. The different cell identifiers may be explicitly conveyed by the reference signal, or it can be implicitly represented by reference signal patterns (i.e., different combinations of resources allocated to the reference signal through time resources, frequency resources, CDM resources, or a combination thereof), or part of the identifier is explicitly conveyed and part of the identifier is implicitly conveyed.

Based on the individual cell identifications 410, victim base station 105-c may be able to further detect whether each cell in the cell group is an aggressor base station. For example, victim base station 105-c may detect a reference signal that conveys cell identification 410-b assigned to the second cell in the cell group. Accordingly, victim base station 105-c may identify that the second cell with cell identification 410-b is the aggressor base station causing the remote interference. Victim base station 105-c may then transmit an indication that it received a reference signal associated with cell identification 410-b to network controller 415 (e.g., indicating the second cell is the aggressor base station). Network controller 415 may then signal for the second cell of the cell group to perform interference mitigation (e.g., delaying transmission, reducing transmit power, etc.) in order to reduce the remote interference experienced by victim base station 105-c. Additionally or alternatively, victim base station 105-c may directly request the aggressor base station to perform the interference mitigation once identified (e.g., through the multi-step reference signal detection).

Additionally or alternatively, if a reference signal is not detected by victim base station 105-c, victim base station 105-c may indicate that no cell in the cell group associated with unique cell group identification 405 is an aggressor base station to victim base station 105-c. Accordingly, network controller may not configure the individual cell identifications 410 for each cell in the cell group.

Figure 5:
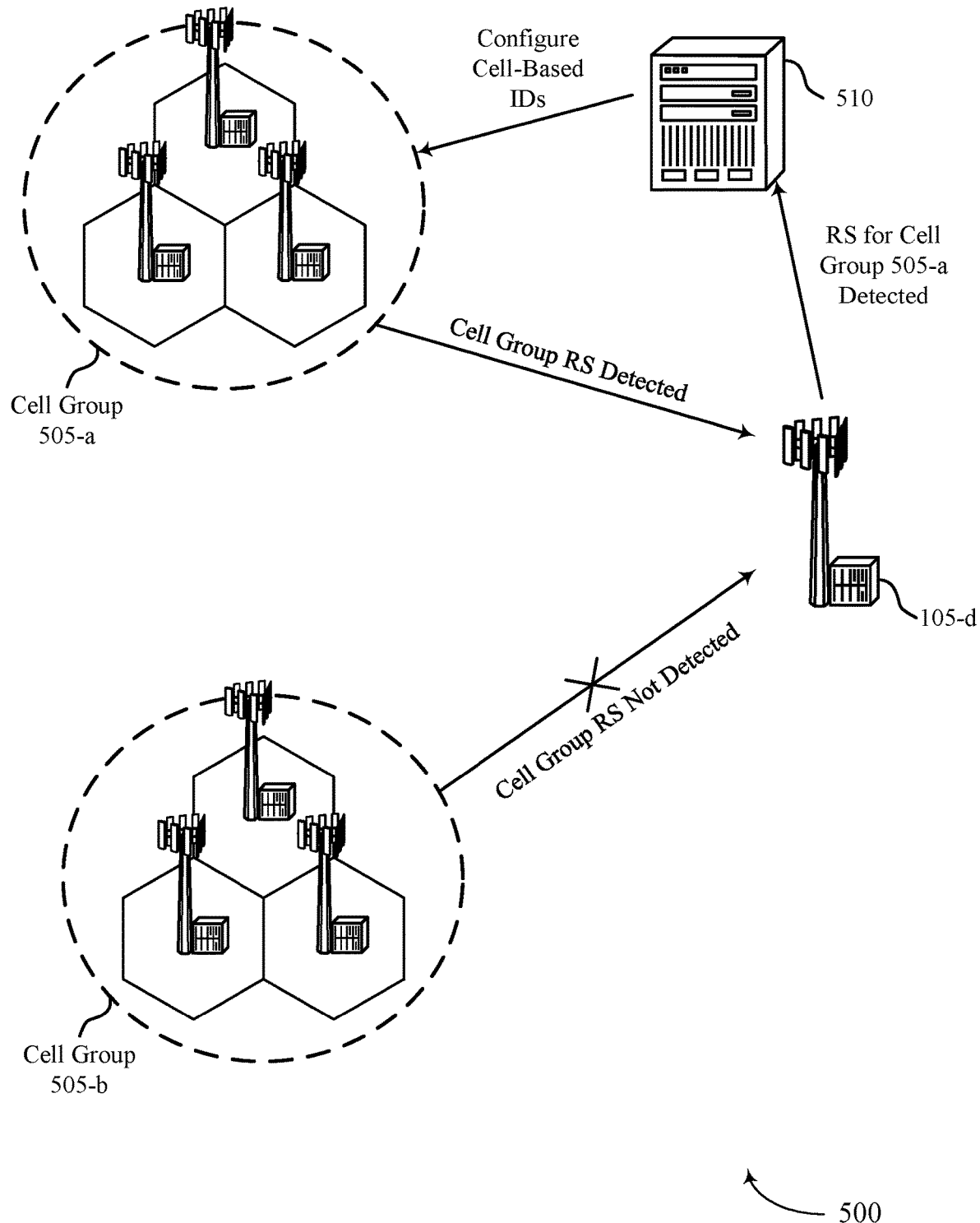
FIG. 5 illustrates an example of a multi-step reference signal detection for interference management in accordance with aspects of the present disclosure.

FIG. 5 illustrates an example of a multi-step reference signal configuration and detection 500 for interference management in accordance with aspects of the present disclosure. In some examples, multi-step reference signal detection 500 may implement aspects of wireless communications systems 100 and/or 400. Multi-step reference signal detection 500 may be used to identify one or more cells (e.g., base stations) causing remote interference at a victim base station 105-d (e.g., victim cell). Additionally, a network controller 510 may be included in multi-step reference signal detection 500 to initially coordinate the identification of one or more cell groups 505 for transmitting reference signals that indicate the cell group as described herein, where network controller 510 may be part of the core network as described herein with reference to FIGS. 1-4.

By using the two-step reference signal detection as described herein with reference to FIG. 4, a network controller 510 may use a limited number of cell group identifications to detect a large number of cells as possible aggressors (e.g., larger than a number of available identifications). As shown, a victim base station 105-d may detect a reference signal (e.g., RIM-RS) from cell group 505-a (e.g., based on a cell group identification for cell group 505-a conveyed in the reference signal). Victim base station 105-d may then initiate a reference signal transmission from each cell in cell group 505-a with cell-based identifications through network controller 510. For example, victim base station 105-d may indicate that a reference signal from cell group 505-a was detected to network controller 510, which further indicates at least one cell in cell group 505-a is an aggressor and causing remote interference at victim base station 105-c. Network controller 510 may then configure cell-based identifications for each cell in cell group 505-a. Accordingly, if victim base station 105-d subsequently receives one or more reference signals indicating remote interference, victim base station 105-d may detect which cell or cells are causing the remote interference through the cell-based identifications. Network controller 510 may then initiate interference mitigation on the detected cells.

Additionally or alternatively, victim base station 105-d may not detect any reference signals from cell group 505-b, indicating that no cell in cell group 505-b is causing remote interference at victim base station 105-d. As such, the cells in cell group 505-b may not be assigned cell-based identifications by network controller 515. The two-step reference signal detection may be based on a two-level cell group structure. For example, the first level structure may contain cell group 505-a and cell group 505-b. The second level structure may then contain individual cells within each cell group 505. However, the reference signal detection may be extended to multiple steps (e.g., multi-step) and a multiple-level cell group structure (e.g., greater than two (2) cell group levels). For example, the two-step reference signal detection may be extended to a general multi-level reference signal detection.

Victim base station 105-*d* may first detect reference signals that convey a top-level cell group identification. Based on the detection result, network controller 510 may divide a detected top-level cell group into cell sub-groups and assign an identification to each cell sub-group. Victim base station 105-*d* may then detect one or more reference signals from one or more respective cell sub-groups. Based on this second reference signal detection result of identifications assigned to the cell sub-groups, network controller 510 may further divide a detected cell sub-group into smaller cell sub-groups and assign an identification to each smaller cell sub-group. This division and additional cell group/cell sub-group identification may continue until each individual cell is assigned an identification and detected by victim base station 105-*d*. For example, finer granularities of cell group identifications may be defined each time aggressor interference is detected (e.g., through receiving/detecting associated reference signals) from a cell group until each aggressor cell is identified based on a corresponding cell sub-group identification and/or individual cell identification.

In some cases, the multi-step reference signal detection may stop early (e.g., before each cell is configured with an individual cell identification). For example, multiple cells in a cell group or cell sub-group may have similar characteristics (e.g., based on similar locations, close proximity, etc.), such that each cell in the cell group or cell sub-group cause remote interference at victim base station 105-*d*. Network controller 510 may know that each cell in the cell group or cell sub-group have the same characteristics and, as such, may initiate interference mitigation for all of the cells in the cell group or cell sub-group rather than assigning individual cell identifications or further splitting the cell group/cell sub-group into smaller groupings.

While the techniques described herein are described in the context of remote interference management, it is to be understood that they may be extended to cross-link interference. For example, one or more aggressor base station may cause interference on a victim UE 115, one or more aggressor UEs 115 may cause interference on the victim UE 115, or some combination thereof. As such, the aggressor UEs 115 and aggressor base stations 105 may be assigned cell group identifications, cell sub-group identifications, down to individual identifications to enable the victim UE 115 to identify the source of the cross link interference and mitigate it accordingly.

Figure 6:
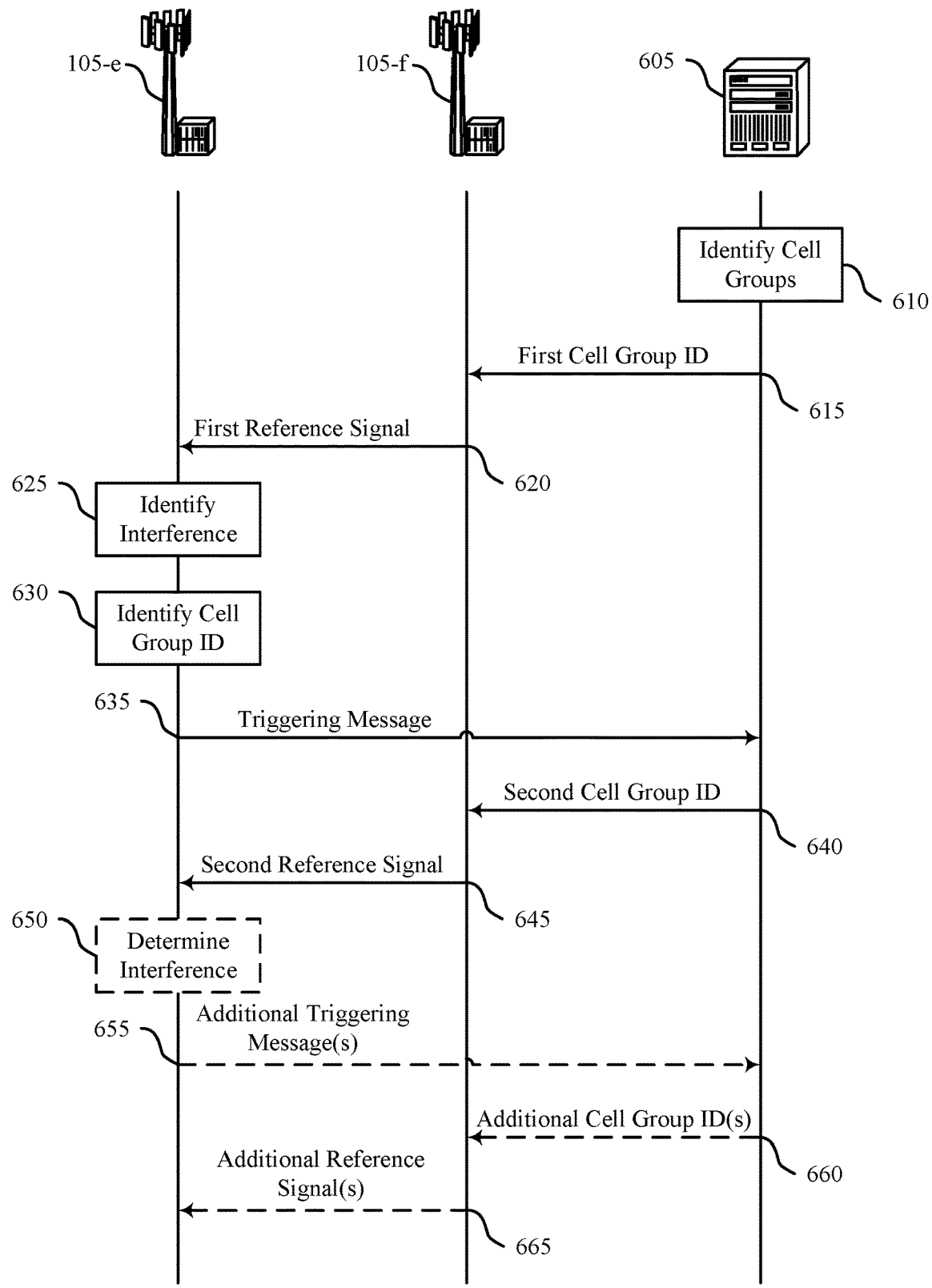
FIG. 6 illustrates an example of a process flow that supports multi-step reference signal configuration and detection for interference management in accordance with aspects of the present disclosure.

FIG. 6 illustrates an example of a process flow 600 that supports multi-step reference signal configuration and detection for interference management in accordance with aspects of the present disclosure. In some examples, process flow 600 may implement aspects described in FIGS. 1 through 5. Network controller 605, base station 105-*e*, and base station 105-*f* may be examples of the corresponding devices described with reference to FIGS. 1 through 5. In some examples, the base station 105-*f* may be an aggressor base station and the base station 105-*e* may be a victim base station. Additionally, network controller 605, base station 105-*e*, and base station 105-*f* may operate in a TDD system.

In the following description of the process flow 600, the operations between network controller 605, base station 105-*e*, and base station 105-*f* may be transmitted in a different order than the exemplary order shown, or the operations performed by network controller 605, base station 105-*e*, and base station 105-*f* may be performed in different orders or at different times. Some operations may also be left out of the process flow 600, or other operations may be added to the process flow 600.

At 610, network controller 605 may identify a group of cells (e.g., aggressor cells or base stations) which are associated with each other based on a likelihood of each cell in the group of cells to cause interference at one or more remote wireless devices (e.g., victim cells or base stations). In some cases, network controller 605 may identify cells which are associated with each other based on a likelihood of each cell in the group of cells to cause interference, by downlink transmission, to reception of uplink transmissions at the one or more remote wireless devices. Additionally or alternatively, network controller 605 may identify cells which are associated with each other based on a likelihood of each cell in the group of cells to cause cross-link interference with the one or more remote wireless devices.

At 615, network controller 605 may transmit a first cell group identifier to base station 105-*f* (e.g., a wireless device of a set of wireless devices in communication with network controller 605), the first cell group identifier representing the group of cells, base station 105-*f* being associated with a first cell of the group of cells.

At 620, base station 105-*f* may transmit a first reference signal that is indicative of the first cell group identifier. In some cases, base station 105-*f* may include the first cell group identifier in the first reference signal as an explicit indication, as an implicit indication, or through a combination of explicit and implicit indications. For example, the implicit indication may include an association of one or more reference signal patterns with the first cell group identifier.

At 625, base station 105-*e* (e.g., victim base station 105-*e*) may identify that a first transmission from a remote wireless device (e.g., aggressor base station 105-*f*) is causing interference at base station 105-*e*, the first transmission including the first reference signal.

At 630, base station 105-*e* may identify, from the first reference signal, the first cell group identifier which indicates the group of cells associated with each other based on a likelihood of each cell in the group of cells to cause interference, base station 105-*f* being associated with the first cell of the group of cells.

At 635, base station 105-*e* may transmit a triggering message to network controller 605 to trigger the assignment of a second cell group identifier to a sub-group of the group of cells, the sub-group including the first cell (e.g., aggressor base station 105-*f*).

At 640, network controller 605 may transmit, to base station 105-*f* and based on receipt of the triggering message, a second cell group identifier representing a sub-group of the group of cells, the sub-group including the first cell. Additionally, network controller 605 may identify the sub-group, where the sub-group includes only the first cell. In some cases, the sub-group may include only the first cell. Additionally or alternatively, the second cell group identifier may be unique among other cell group identifiers associated with other sub-groups of the group of cells, among other cell group identifiers associated with other sub-groups at a same sub-group level within the group of cells, or among other cell group identifiers associated with other sub-groups at any sub-group level within the group of cells.

At 645, base station 105-*f* may transmit a second reference signal that is indicative of the second cell group identifier.

At 650, base station 105-*e* may determine that the second transmission is causing interference at base station 105-*e*.

At 655, base station 105-*e* may transmit one or more additional triggering messages to network controller 605 based on the second transmission being an interfering transmission. Accordingly, network controller 605 may receive the one or more additional triggering messages indicating that base station 105-*e* received additional interfering transmissions that included either a second reference signal indicative of the second cell group identifier, or additional reference signals indicative of additional cell group identifiers associated with one or more nested sub-groups of the group of cells.

At 660, network controller 605 may transmit one or more additional cell group identifiers to base station 105-*f*, based on receiving the one or more additional triggering messages, the one or more additional cell group identifiers representing one or more additional nested sub-groups (e.g., smaller cell sub-groups) of the group of cells, with a last cell group identifier representing the first cell. Accordingly, base station 105-*f* may receive the one or more additional cell group identifiers based on the second reference signal being part an additional interfering transmission at base station 105-*e*.

At 665, base station 105-*e* may receive the one or more additional transmissions from base station 105-*f*, each of the one or more additional transmissions including the reference signal indicative of the corresponding additional cell group identifier, the additional cell group identifiers representing the one or more additional nested sub-groups of the group of cells.

Figure 7:
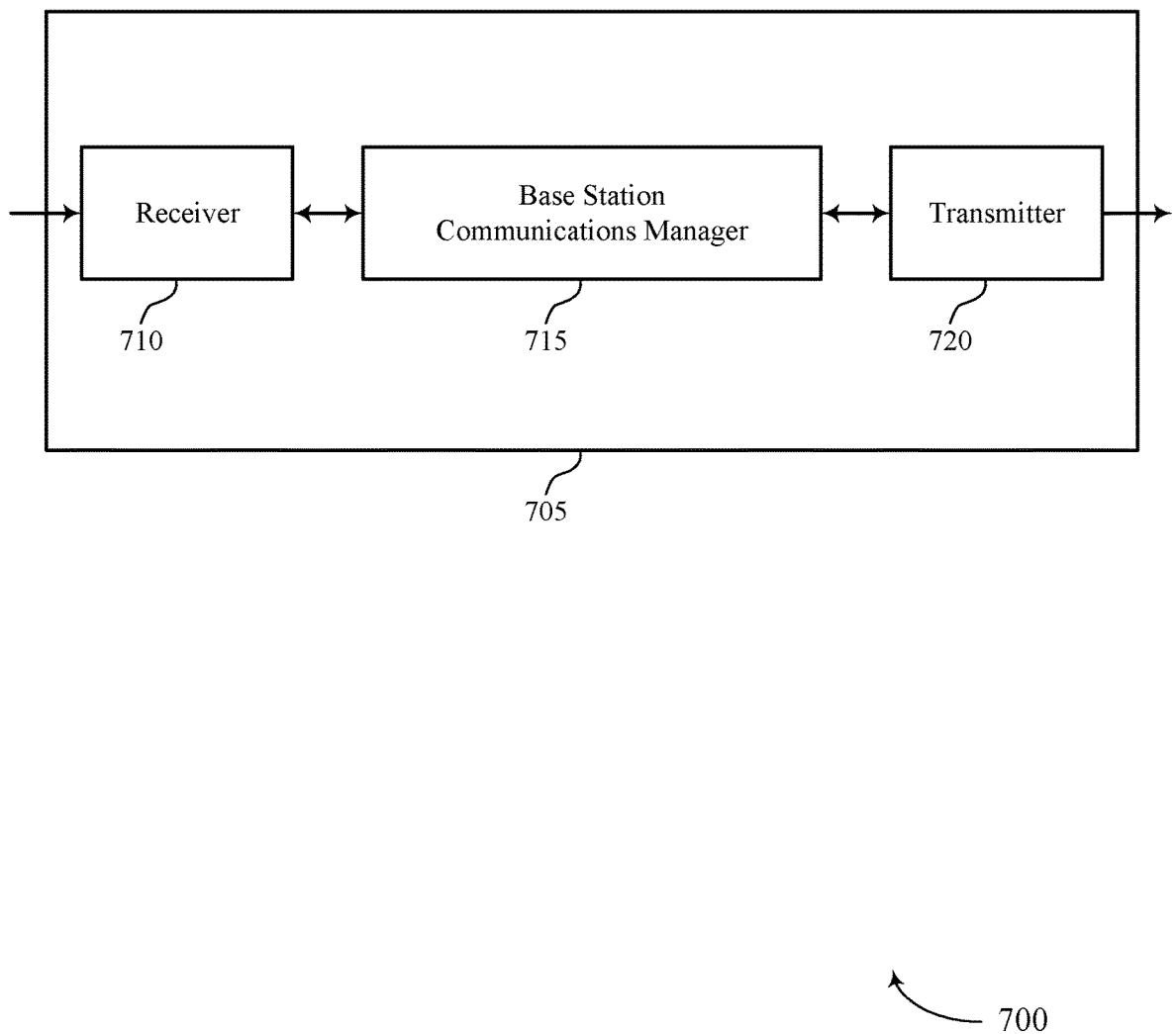
FIGS. 7 and 8 show block diagrams of devices that support multi-step reference signal configuration and detection for interference management in accordance with aspects of the present disclosure.

FIG. 7 shows a block diagram 700 of a device 705 that supports multi-step reference signal configuration and detection for interference management in accordance with aspects of the present disclosure. The device 705 may be an example of aspects of a base station 105 as described herein. The device 705 may include a receiver 710, a base station communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to multi-step reference signal configuration and detection for interference management, etc.). Information may be passed on to other components of the device 705. The receiver 710 may be an example of aspects of the transceiver 1020 described with reference to FIG. 10. The receiver 710 may utilize a single antenna or a set of antennas.

The base station communications manager 715 may include various features, as described herein, though only some features may be used when the device 705 is acting as an aggressor base station (or aggressor wireless device), while other features may be limited to use when the device 705 is acting as a victim base station (or victim wireless device). For example, when acting as part of an aggressor base station, the base station communications manager 715 may receive a first cell group identifier from a network controller, the first cell group identifier representing a group of cells which are associated with each other based on a likelihood of each cell in the group of cells to cause interference at one or more victim wireless devices (e.g., remote wireless devices), the aggressor base station (e.g., a first wireless device) being associated with a first cell of the group of cells. In some cases, the base station communications manager 715 may transmit a first reference signal that is indicative of the first cell group identifier. Additionally, the base station communications manager 715 may receive, from the network controller and based on the first reference signal being part of an interfering transmission at a victim wireless device, a second cell group identifier representing a sub-group of the group of cells, the sub-group including the first cell. The base station communications manager 715 may then transmit one or more second reference signals that are indicative of the second cell group identifier.

Additionally or alternatively, when acting as part of a victim base station, the base station communications manager 715 may identify that a first transmission from an aggressor base station (e.g., a remote wireless device) is causing interference at the victim base station (e.g., a first wireless device), the first transmission including a first reference signal. In some cases, the base station communications manager 715 may identify, from the first reference signal, a first cell group identifier which indicates a group of cells which are associated with each other based on a likelihood of each cell in the group of cells to cause interference, the aggressor base station being associated with a first cell of the group of cells. The base station communications manager 715 may then transmit a triggering message to a network controller to trigger the assignment of a second cell group identifier to a sub-group of the group of cells, the sub-group including the first cell. In some cases, the base station communications manager 715 may receive one or more second transmissions from the aggressor base station (e.g., the remote wireless device), the one or more second transmissions including at least a second reference signal that is indicative of the second cell group identifier. The base station communications manager 715 may be an example of aspects of the base station communications manager 1010 described herein.

The base station communications manager 715, or its sub-components, may be implemented in hardware, code (e.g., software or firmware) executed by a processor, or any combination thereof. If implemented in code executed by a processor, the functions of the base station communications manager 715, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The base station communications manager 715, or its sub-components, may be physically located at various positions, including being distributed such that portions of functions are implemented at different physical locations by one or more physical components. In some examples, the base station communications manager 715, or its sub-components, may be a separate and distinct component in accordance with various aspects of the present disclosure. In some examples, the base station communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
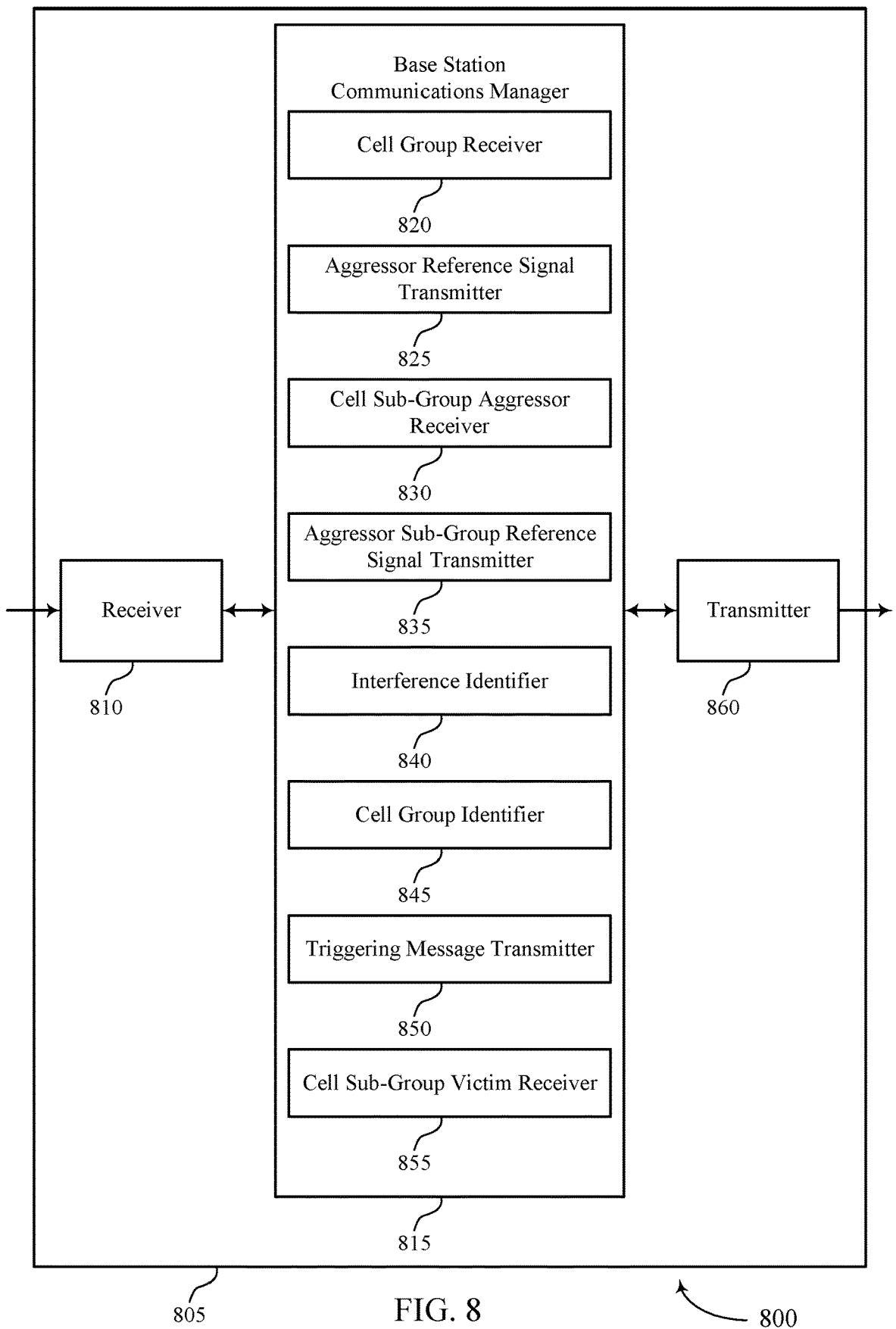

FIG. 8 shows a block diagram 800 of a device 805 that supports multi-step reference signal configuration and detection for interference management in accordance with aspects of the present disclosure. The device 805 may be an example of aspects of a device 705, or a base station 105 as described herein. The device 805 may include a receiver 810, a base station communications manager 815, and a transmitter 860. The device 805 may also include a processor. Each of these components may be in communication with one another (e.g., via one or more buses).

The receiver 810 may receive information such as packets, user data, or control information associated with various information channels (e.g., control channels, data channels, and information related to multi-step reference signal configuration and detection for interference management, etc.). Information may be passed on to other components of the device 805. The receiver 810 may be an example of aspects of the transceiver 1020 described with reference to FIG. 10. The receiver 810 may utilize a single antenna or a set of antennas.

The base station communications manager 815 may be an example of aspects of the base station communications manager 715 as described herein. The base station communications manager 815 may include various features, as described herein, though only some features may be used when the device 805 is acting as an aggressor base station (or aggressor wireless device), while other features may be limited to use when the device 805 is acting as a victim base station (or victim wireless device). The base station communications manager 815 may include a cell group receiver 820, an aggressor reference signal transmitter 825, a cell sub-group aggressor receiver 830, an aggressor sub-group reference signal transmitter 835, an interference identifier 840, a cell group identifier 845, a triggering message transmitter 850, and a cell sub-group victim receiver 855. The base station communications manager 815 may be an example of aspects of the base station communications manager 1010 described herein.

When the device 805 is acting as an aggressor wireless device, the base station communications manager 815 may include and use a cell group receiver 820. The cell group receiver 820 may receive a first cell group identifier from a network controller, the first cell group identifier representing a group of cells which are associated with each other based on a likelihood of each cell in the group of cells to cause interference at one or more remote wireless devices, the device 805 (e.g., an aggressor wireless device or a first wireless device) being associated with a first cell of the group of cells.

When the device 805 is acting as an aggressor wireless device, the base station communications manager 815 may include and use an aggressor reference signal transmitter 825. The aggressor reference signal transmitter 825 may transmit a first reference signal that is indicative of the first cell group identifier.

When the device 805 is acting as an aggressor wireless device, the base station communications manager 815 may include and use a cell sub-group aggressor receiver 830. The cell sub-group aggressor receiver 830 may receive, from the network controller and based on the first reference signal being part of an interfering transmission at a victim wireless device (e.g., a remote wireless device), a second cell group identifier representing a sub-group of the group of cells, the sub-group including the first cell.

When the device 805 is acting as an aggressor wireless device, the base station communications manager 815 may include and use an cell aggressor sub-group reference signal transmitter 835. The aggressor sub-group reference signal transmitter 835 may transmit one or more second reference signals that are indicative of the second cell group identifier.

When the device 805 is acting as a victim wireless device, the base station communications manager 815 may include and use an interference identifier 820. The interference identifier 840 may identify that a first transmission from an aggressor wireless device (e.g., a remote wireless device) is causing interference at the victim wireless device (e.g., a first wireless device), the first transmission including a first reference signal.

When the device 805 is acting as a victim wireless device, the base station communications manager 815 may include and use a cell group identifier 845. The cell group identifier 845 may identify, from the first reference signal, a first cell group identifier which indicates a group of cells which are associated with each other based on a likelihood of each cell in the group of cells to cause interference, the aggressor wireless device (e.g., the remote wireless device) being associated with a first cell of the group of cells.

When the device 805 is acting as a victim wireless device, the base station communications manager 815 may include and use a triggering message transmitter 850. The triggering message transmitter 850 may transmit a triggering message to a network controller to trigger the assignment of a second cell group identifier to a sub-group of the group of cells, the sub-group including the first cell.

When the device 805 is acting as a victim wireless device, the base station communications manager 815 may include and use a sub-group victim receiver 855. The cell sub-group victim receiver 855 may receive one or more second transmissions from the aggressor wireless device (e.g., the remote wireless device), the one or more second transmissions including at least a second reference signal that is indicative of the second cell group identifier.

The transmitter 860 may transmit signals generated by other components of the device 805. In some examples, the transmitter 860 may be collocated with a receiver 810 in a transceiver module. For example, the transmitter 860 may be an example of aspects of the transceiver 1020 described with reference to FIG. 10. The transmitter 860 may utilize a single antenna or a set of antennas.

Figure 9:
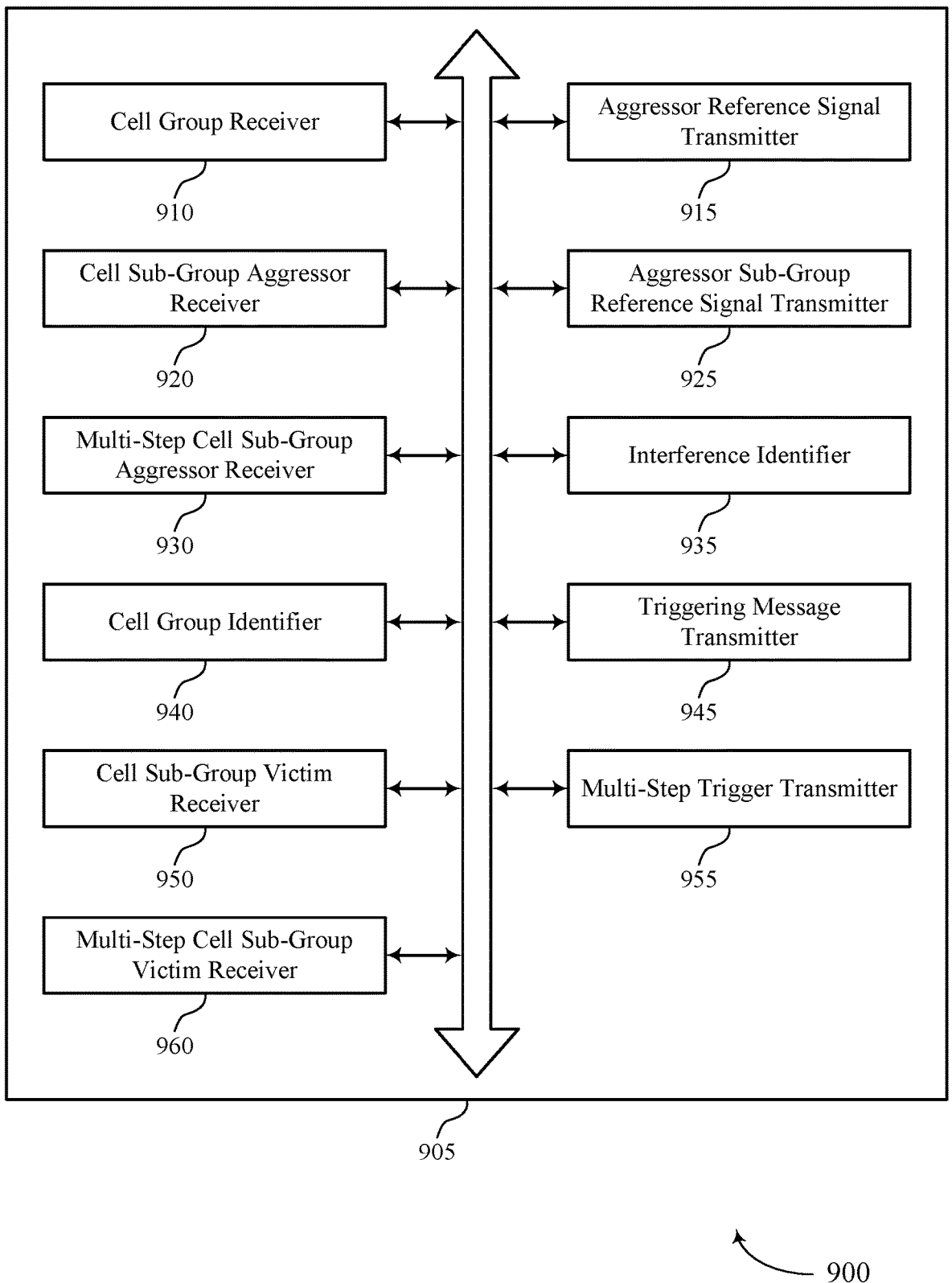
FIG. 9 shows a block diagram of a base station communications manager that supports multi-step reference signal configuration and detection for interference management in accordance with aspects of the present disclosure.

FIG. 9 shows a block diagram 900 of a base station communications manager 905 that supports multi-step reference signal configuration and detection for interference management in accordance with aspects of the present disclosure. The base station communications manager 905 may be an example of aspects of a base station communications manager 715, a base station communications manager 815, or a base station communications manager 1010 described herein. The base station communications manager 905 may include various features, as described herein, though only some features may be used when the device is acting as an aggressor base station (or aggressor wireless device), while other features may be limited to use when the device is acting as a victim base station (or victim wireless device). The base station communications manager 905 may include a cell group receiver 910, an aggressor reference signal transmitter 915, a cell sub-group aggressor receiver 920, an aggressor sub-group reference signal transmitter 925, a multi-step cell sub-group aggressor receiver 930, an interference identifier 935, a cell group identifier 940, a triggering message transmitter 945, a cell sub-group victim receiver 950, a multi-step trigger transmitter 955, and a multi-step cell sub-group victim receiver 960. Each of these modules may communicate, directly or indirectly, with one another (e.g., via one or more buses).

When the device is acting as an aggressor wireless device, the base station communications manager 905 may include and use a cell group receiver 910. The cell group receiver 910 may receive a first cell group identifier from a network controller, the first cell group identifier representing a group of cells which are associated with each other based on a likelihood of each cell in the group of cells to cause interference at one or more victim wireless devices (e.g., remote wireless devices), the aggressor wireless device (e.g., a first wireless device) being associated with a first cell of the group of cells. In some examples, the cell group receiver 910 may cells of the group of cells are associated with each other based on a likelihood of each cell in the group of cells to cause interference, by downlink transmission, to reception of uplink transmissions at the one or more victim wireless devices. Additionally or alternatively, the cell group receiver 910 may cells of the group of cells are associated with each other based on a likelihood of each cell in the group of cells to cause cross-link interference with the one or more victim wireless devices.

When the device is acting as an aggressor wireless device, the base station communications manager 905 may include and use an aggressor reference signal transmitter 915. The aggressor reference signal transmitter 915 may transmit a first reference signal that is indicative of the first cell group identifier. In some examples, the aggressor reference signal transmitter 915 may include the first cell group identifier in the first reference signal as an explicit indication. Additionally or alternatively, the aggressor reference signal transmitter 915 may include the first cell group identifier in the first reference signal as an implicit indication. Additionally or alternatively, the aggressor reference signal transmitter 915 may include the first cell group identifier in the first reference signal through a combination of explicit and implicit indications. In some cases, the implicit indication may be through association of one or more reference signal patterns with the first cell group identifier.

When the device is acting as an aggressor wireless device, the base station communications manager 905 may include and use a cell sub-group aggressor receiver 920. The cell sub-group aggressor receiver 920 may receive, from the network controller and based on the first reference signal being part of an interfering transmission at a victim wireless device, a second cell group identifier representing a sub-group of the group of cells, the sub-group including the first cell. In some cases, the sub-group may include only the first cell. Additionally, the second cell group identifier may be unique among other cell group identifiers associated with other sub-groups of the group of cells. In some cases, the second cell group identifier may be unique among other cell group identifiers associated with other sub-groups at a same sub-group level within the group of cells. Additionally or alternatively, the second cell group identifier may be unique among other cell group identifiers associated with other sub-groups at any sub-group level within the group of cells.

When the device is acting as an aggressor wireless device, the base station communications manager 905 may include and use an aggressor sub-group reference signal transmitter 925. The aggressor sub-group reference signal transmitter 925 may transmit one or more second reference signals that are indicative of the second cell group identifier.

When the device is acting as a victim wireless device, the base station communications manager 905 may include and use an interference identifier 935. The interference identifier 935 may identify that a first transmission from an aggressor wireless device (e.g., a remote wireless device) is causing interference at the victim wireless device (e.g., a first wireless device), the first transmission including a first reference signal. In some examples, the interference identifier 935 may determine that the one or more second transmissions are causing interference at the victim wireless device.

When the device is acting as a victim wireless device, the base station communications manager 905 may include and use a cell group identifier 940. The cell group identifier 940 may identify, from the first reference signal, a first cell group identifier which indicates a group of cells which are associated with each other based on a likelihood of each cell in the group of cells to cause interference, the aggressor wireless device being associated with a first cell of the group of cells. In some examples, the cell group identifier 940 may receive the first cell group identifier as an explicit indication in the first reference signal. Additionally or alternatively, the cell group identifier 940 may determine the first cell group identifier from an implicit indication of the first reference signal. Additionally or alternatively, the cell group identifier 940 may determine the first cell group identifier through a combination of explicit and implicit indications in the first reference signal.

In some examples, the cell group identifier 940 may identify cells of the group of cells are associated with each other based on a likelihood of each cell in the group of cells to cause interference, by downlink transmission, to reception of uplink transmissions at the victim wireless device. Additionally or alternatively, the cell group identifier 940 may cells of the group of cells are associated with each other based on a likelihood of each cell in the group of cells to cause cross-link interference with the victim wireless device. In some cases, the implicit indication is through association of one or more reference signal patterns with the first cell group identifier.

When the device is acting as a victim wireless device, the base station communications manager 905 may include and use a triggering message transmitter 945. The triggering message transmitter 945 may transmit a triggering message to a network controller to trigger the assignment of a second cell group identifier to a sub-group of the group of cells, the sub-group including the first cell.

When the device is acting as a victim wireless device, the base station communications manager 905 may include and use a cell sub-group victim receiver 950. The cell sub-group victim receiver 950 may receive one or more second transmissions from the aggressor wireless device (e.g., a remote wireless device), the one or more second transmissions including at least a second reference signal that is indicative of the second cell group identifier.

When the device is acting as an aggressor wireless device, the base station communications manager 905 may include and use a multi-step cell sub-group aggressor receiver 930. The multi-step cell sub-group aggressor receiver 930 may receive, from the network controller and based on the one or more second reference signals being part of an additional interfering transmission at the victim wireless device (e.g., a remote wireless device), one or more additional cell group identifiers representing one or more additional nested sub-groups of the group of cells, with a last cell group identifier representing the first cell.

When the device is acting as a victim wireless device, the base station communications manager 905 may include and use a multi-step trigger transmitter 955. The multi-step trigger transmitter 955 may transmit one or more additional triggering messages to the network controller based on the second transmission being an interfering transmission.

When the device is acting as a victim wireless device, the base station communications manager 905 may include and use a multi-step cell sub-group victim receiver 960. The multi-step cell sub-group victim receiver 960 may receive one or more additional transmissions from the aggressor wireless device (e.g., the remote wireless device), each of the one or more additional transmissions including a reference signal indicative of a corresponding additional cell group identifier, the additional cell group identifiers representing one or more additional nested sub-groups of the group of cells. In some cases, a last cell group identifier associated with a last reference signal may represent the first cell.

Figure 10:
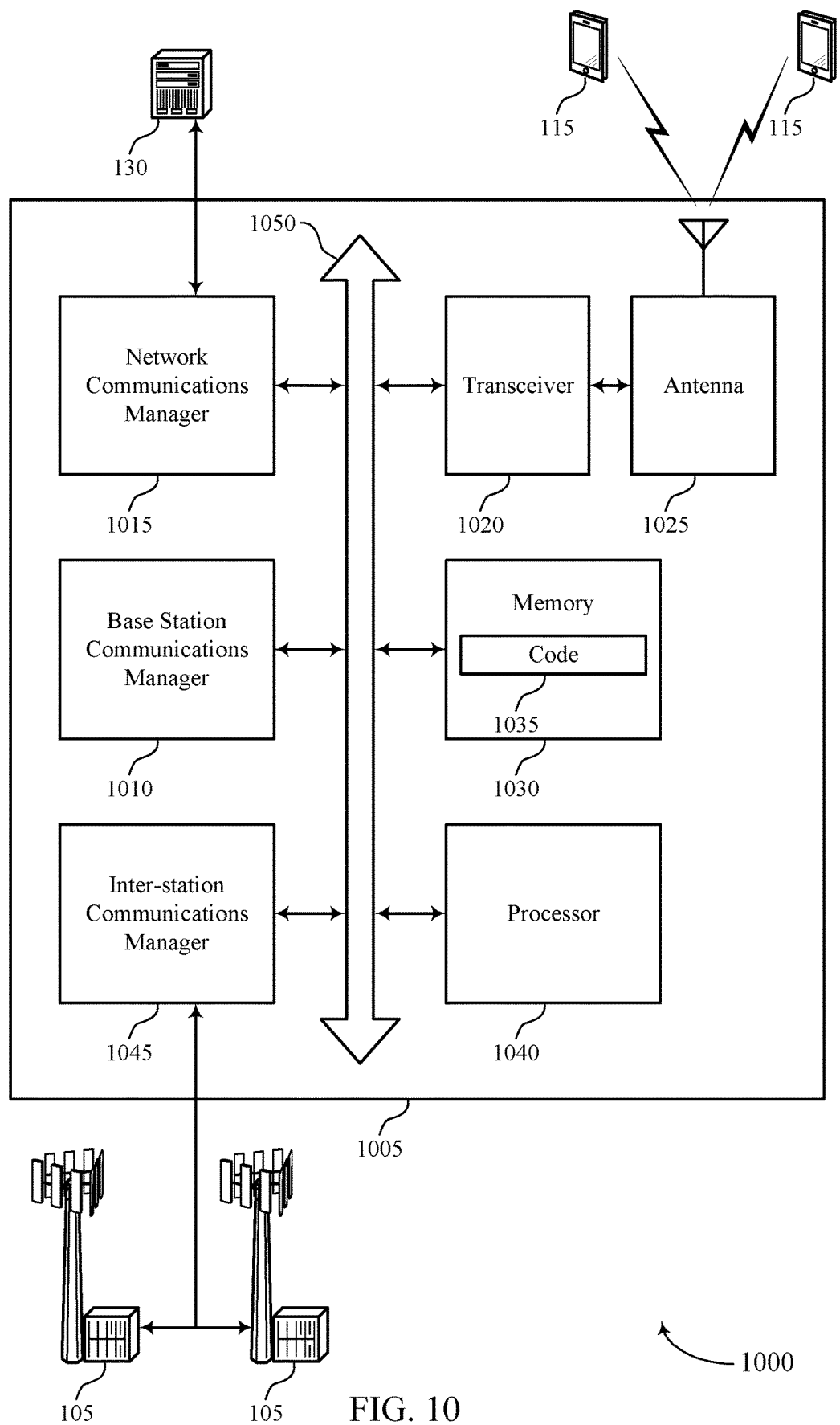
FIG. 10 shows a diagram of a system including a device that supports multi-step reference signal configuration and detection for interference management in accordance with aspects of the present disclosure.

FIG. 10 shows a diagram of a system 1000 including a device 1005 that supports multi-step reference signal configuration and detection for interference management in accordance with aspects of the present disclosure. The device 1005 may be an example of or include the components of device 705, device 805, or a base station 105 as described herein. The device 1005 may include components for bi-directional voice and data communications including components for transmitting and receiving communications, including a base station communications manager 1010, a network communications manager 1015, a transceiver 1020, an antenna 1025, memory 1030, a processor 1040, and an inter-station communications manager 1045. These components may be in electronic communication via one or more buses (e.g., bus 1050).

When device 1005 is acting as an aggressor wireless device, the base station communications manager 1010 may receive a first cell group identifier from a network controller, the first cell group identifier representing a group of cells which are associated with each other based on a likelihood of each cell in the group of cells to cause interference at one or more victim wireless devices (e.g., remote wireless devices), the aggressor wireless device (e.g., a first wireless device) being associated with a first cell of the group of cells. In some cases, the base station communications manager 1010 may transmit a first reference signal that is indicative of the first cell group identifier. Additionally, the base station communications manager 1010 may receive, from the network controller and based on the first reference signal being part of an interfering transmission at a victim wireless device, a second cell group identifier representing a sub-group of the group of cells, the sub-group including the first cell. The base station communications manager 1010 may then transmit one or more second reference signals that are indicative of the second cell group identifier.

Additionally or alternatively, when device 1005 is acting as a victim wireless device, the base station communications manager 1010 may identify that a first transmission from an aggressor wireless device (e.g., a remote wireless device) is causing interference at the victim wireless device (e.g., a first wireless device), the first transmission including a first reference signal. In some cases, the base station communications manager 1010 may identify, from the first reference signal, a first cell group identifier which indicates a group of cells which are associated with each other based on a likelihood of each cell in the group of cells to cause interference, the aggressor wireless device being associated with a first cell of the group of cells. The base station communications manager 1010 may then transmit a triggering message to a network controller to trigger the assignment of a second cell group identifier to a sub-group of the group of cells, the sub-group including the first cell. In some cases, the base station communications manager 1010 may receive one or more second transmissions from the aggressor wireless device, the one or more second transmissions including at least a second reference signal that is indicative of the second cell group identifier.

The network communications manager 1015 may manage communications with the core network (e.g., via one or more wired backhaul links). For example, the network communications manager 1015 may manage the transfer of data communications for client devices, such as one or more UEs 115.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM), read-only memory (ROM), or a combination thereof. The memory 1030 may store computer-readable code 1035 including instructions that, when executed by a processor (e.g., the processor 1040) cause the device to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1040 may be configured to operate a memory array using a memory controller. In some cases, a memory controller may be integrated into processor 1040. The processor 1040 may be configured to execute computer-readable instructions stored in a memory (e.g., the memory 1030) to cause the device 1005 to perform various functions (e.g., functions or tasks supporting multi-step reference signal configuration and detection for interference management).

The inter-station communications manager 1045 may manage communications with other base station 105 and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, the inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
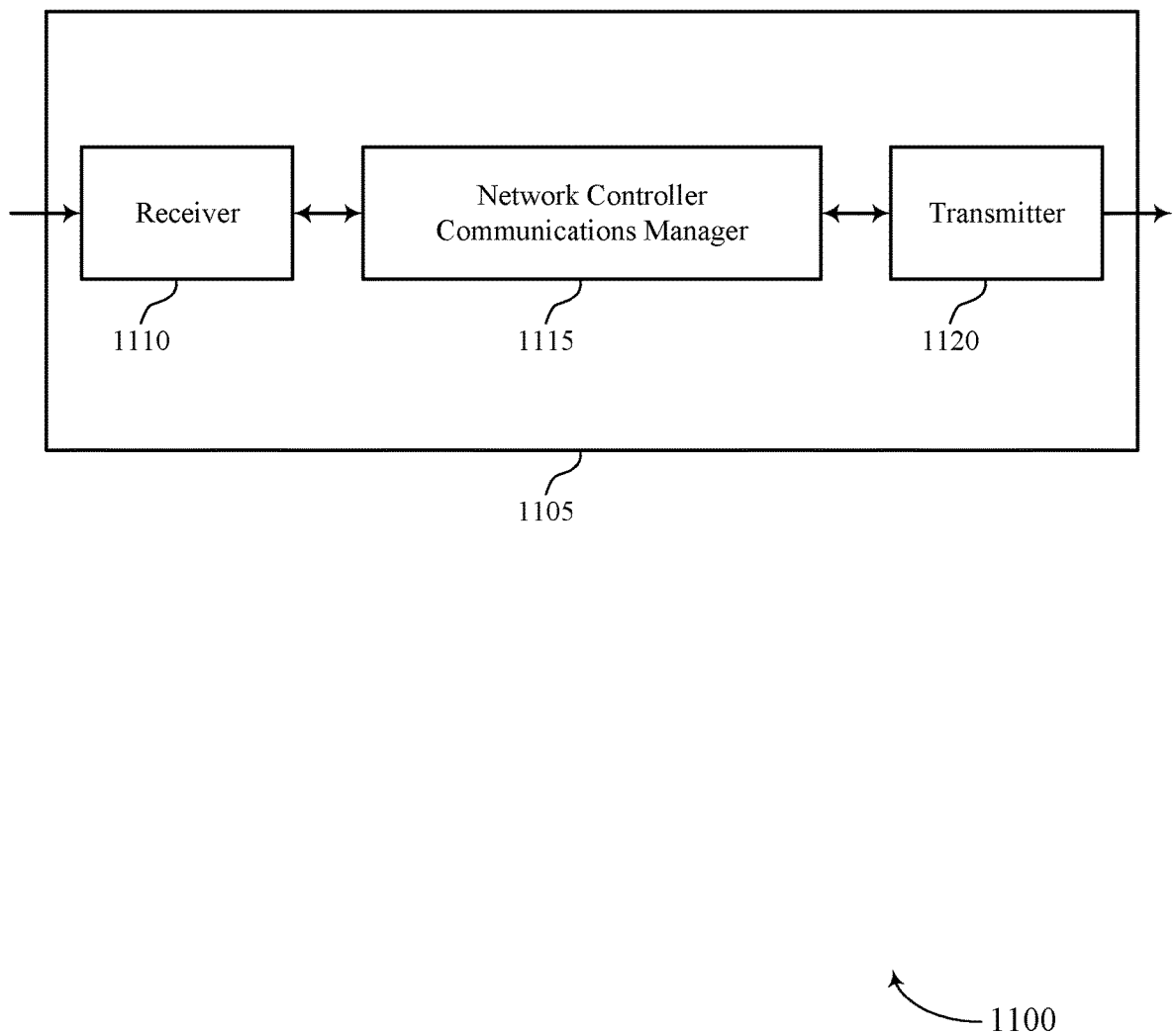
FIGS. 11 and 12 show block diagrams of devices that support multi-step reference signal configuration and detection for interference management in accordance with aspects of the present disclosure.

FIG. 11 shows a block diagram 1100 of a device 1105 that supports multi-step reference signal configuration and detection for interference management in accordance with aspects of the present disclosure. The device 1105 may be an example of aspects of a network entity as described herein. The device 1105 may include a receiver 1110, a network controller communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to multi-step reference signal configuration and detection for interference management, etc.). Information may be passed on to other components of the device 1105. The receiver 1110 may be an example of aspects of the transceiver 1420 described with reference to FIG. 14. The receiver 1110 may utilize a single antenna or a set of antennas.

The network controller communications manager 1115 may identify a group of cells which are associated with each other based on a likelihood of each cell in the group of cells to cause interference at one or more remote wireless devices (e.g., victim wireless devices). In some cases, the network controller communications manager 1115 may transmit a first cell group identifier to a first wireless device (e.g., aggressor wireless device) of the set of wireless devices, the first cell group identifier representing the group of cells, the first wireless device being associated with a first cell of the group of cells. Additionally, the network controller communications manager 1115 may receive a triggering message indicating that a remote wireless device received an interfering transmission that included a first reference signal indicative of the first cell group identifier. Accordingly, the network controller communications manager 1115 may transmit to the first wireless device and based on receipt of the triggering message, a second cell group identifier representing a sub-group of the group of cells, the sub-group including the first cell. The network controller communications manager 1115 may be an example of aspects of the network controller communications manager 1410 described herein.

The network controller communications manager 1115, or its sub-components, may be implemented in hardware, code (e.g., software or firmware) executed by a processor, or any combination thereof. If implemented in code executed by a processor, the functions of the network controller communications manager 1115, or its sub-components may be executed by a general-purpose processor, a DSP, an ASIC, an FPGA or other PLD, discrete gate or transistor logic, discrete hardware components, or any combination thereof designed to perform the functions described in the present disclosure.

The network controller communications manager 1115, or its sub-components, may be physically located at various positions, including being distributed such that portions of functions are implemented at different physical locations by one or more physical components. In some examples, the network controller communications manager 1115, or its sub-components, may be a separate and distinct component in accordance with various aspects of the present disclosure. In some examples, the network controller communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
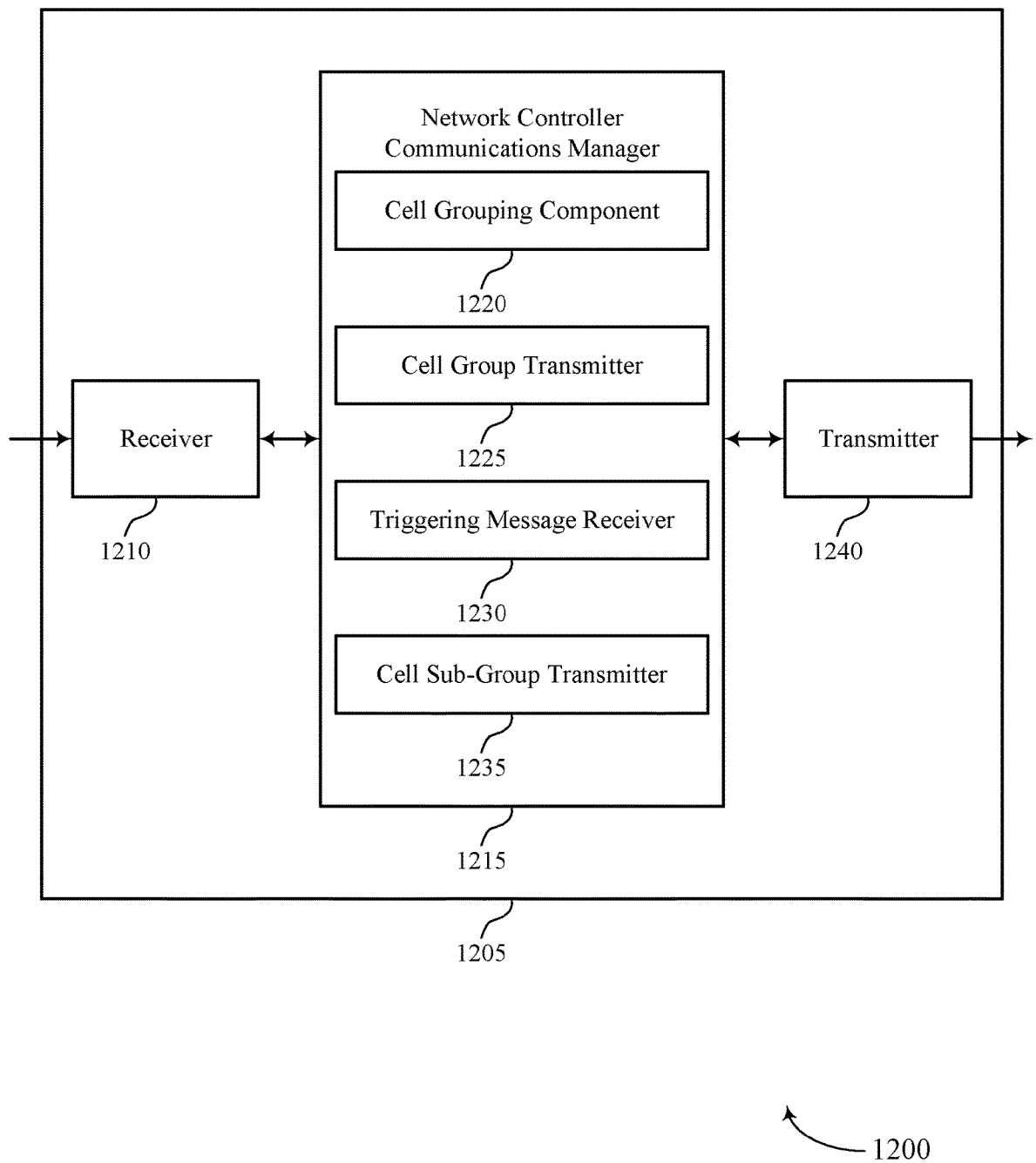

FIG. 12 shows a block diagram 1200 of a device 1205 that supports multi-step reference signal configuration and detection for interference management in accordance with aspects of the present disclosure. The device 1205 may be an example of aspects of a device 1105 or a network entity as described herein. The device 1205 may include a receiver 1210, a network controller communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to multi-step reference signal configuration and detection for interference management, etc.). Information may be passed on to other components of the device 1205. The receiver 1210 may be an example of aspects of the transceiver 1420 described with reference to FIG. 14. The receiver 1210 may utilize a single antenna or a set of antennas.

The network controller communications manager 1215 may be an example of aspects of the network controller communications manager 1115 as described herein. The network controller communications manager 1215 may include a cell grouping component 1220, a cell group transmitter 1225, a triggering message receiver 1230, and a cell sub-group transmitter 1235. The network controller communications manager 1215 may be an example of aspects of the network controller communications manager 1410 described herein.

The cell grouping component 1220 may identify a group of cells which are associated with each other based on a likelihood of each cell in the group of cells to cause interference at one or more remote wireless devices (e.g., victim wireless devices).

The cell group transmitter 1225 may transmit a first cell group identifier to a first wireless device (e.g., aggressor wireless device) of the set of wireless devices, the first cell group identifier representing the group of cells, the first wireless device being associated with a first cell of the group of cells.

The triggering message receiver 1230 may receive a triggering message indicating that a remote wireless device received an interfering transmission that included a first reference signal indicative of the first cell group identifier.

The cell sub-group transmitter 1235 may transmit to the first wireless device and based on receipt of the triggering message, a second cell group identifier representing a sub-group of the group of cells, the sub-group including the first cell.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
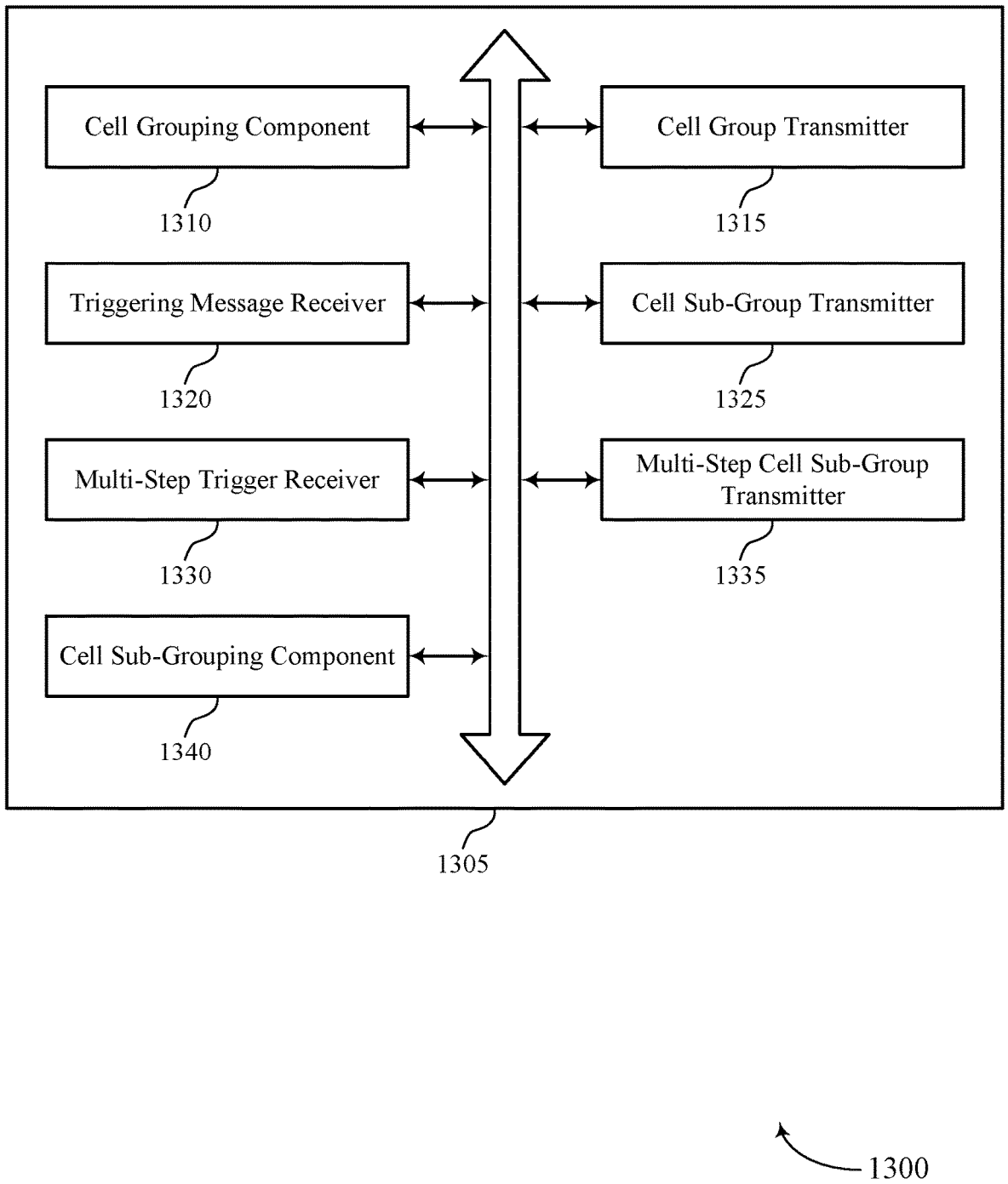
FIG. 13 shows a block diagram of a network controller communications manager that supports multi-step reference signal configuration and detection for interference management in accordance with aspects of the present disclosure.

FIG. 13 shows a block diagram 1300 of a network controller communications manager 1305 that supports multi-step reference signal configuration and detection for interference management in accordance with aspects of the present disclosure. The network controller communications manager 1305 may be an example of aspects of a network controller communications manager 1115, a network controller communications manager 1215, or a network controller communications manager 1410 described herein. The network controller communications manager 1305 may include a cell grouping component 1310, a cell group transmitter 1315, a triggering message receiver 1320, a cell sub-group transmitter 1325, a multi-step trigger receiver 1330, a multi-step cell sub-group transmitter 1335, and a cell sub-grouping component 1340. Each of these modules may communicate, directly or indirectly, with one another (e.g., via one or more buses).

The cell grouping component 1310 may identify a group of cells which are associated with each other based on a likelihood of each cell in the group of cells to cause interference at one or more remote wireless devices (e.g., victim wireless devices). In some examples, the cell grouping component 1310 may identify cells which are associated with each other based on a likelihood of each cell in the group of cells to cause interference, by downlink transmission, to reception of uplink transmissions at the one or more remote wireless devices. Additionally or alternatively, the cell grouping component 1310 may identify cells which are associated with each other based on a likelihood of each cell in the group of cells to cause cross-link interference with the one or more remote wireless devices.

The cell group transmitter 1315 may transmit a first cell group identifier to a first wireless device (e.g., aggressor wireless device) of the set of wireless devices, the first cell group identifier representing the group of cells, the first wireless device being associated with a first cell of the group of cells.

The triggering message receiver 1320 may receive a triggering message indicating that a remote wireless device received an interfering transmission that included a first reference signal indicative of the first cell group identifier.

The cell sub-group transmitter 1325 may transmit to the first wireless device and based on receipt of the triggering message, a second cell group identifier representing a sub-group of the group of cells, the sub-group including the first cell.

The multi-step trigger receiver 1330 may receive one or more additional triggering messages indicating that the remote wireless device received additional interfering transmissions that included either a second reference signal indicative of the second cell group identifier, or additional reference signals indicative of additional cell group identifiers associated with one or more nested sub-groups of the group of cells.

The multi-step cell sub-group transmitter 1335 may transmit one or more additional cell group identifiers to the first wireless device, based on receiving the one or more additional triggering messages, the one or more additional cell group identifiers representing one or more additional nested sub-groups of the group of cells, with a last cell group identifier representing the first cell.

The cell sub-grouping component 1340 may identify the sub-group, where the sub-group includes only the first cell. In some cases, the second cell group identifier may be unique among other cell group identifiers associated with other sub-groups of the group of cells. Additionally, the second cell group identifier may be unique among other cell group identifiers associated with other sub-groups at a same sub-group level within the group of cells. Additionally or alternatively, the second cell group identifier may be unique among other cell group identifiers associated with other sub-groups at any sub-group level within the group of cells.

Figure 14:
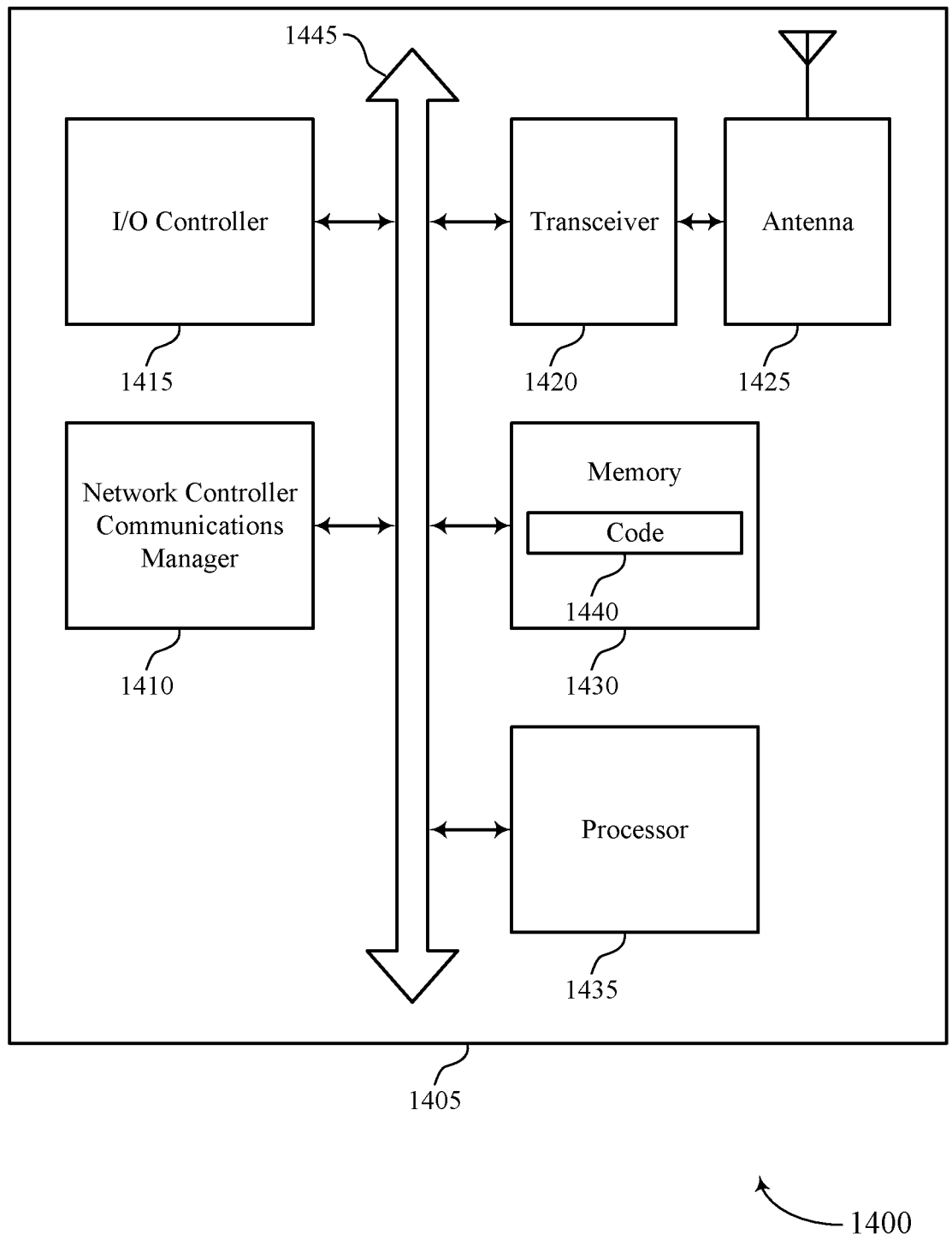
FIG. 14 shows a diagram of a system including a device that supports multi-step reference signal configuration and detection for interference management in accordance with aspects of the present disclosure.

FIG. 14 shows a diagram of a system 1400 including a device 1405 that supports multi-step reference signal configuration and detection for interference management in accordance with aspects of the present disclosure. The device 1405 may be an example of or include the components of device 1105, device 1205, or a network entity as described herein. The device 1405 may include components for bi-directional voice and data communications including components for transmitting and receiving communications, including a network controller communications manager 1410, an I/O controller 1415, a transceiver 1420, an antenna 1425, memory 1430, and a processor 1435. These components may be in electronic communication via one or more buses (e.g., bus 1445).

The network controller communications manager 1410 may identify a group of cells which are associated with each other based on a likelihood of each cell in the group of cells to cause interference at one or more remote wireless devices. In some cases, the network controller communications manager 1410 may transmit a first cell group identifier to a first wireless device of the set of wireless devices, the first cell group identifier representing the group of cells, the first wireless device being associated with a first cell of the group of cells. Additionally, the network controller communications manager 1410 may receive a triggering message indicating that a remote wireless device received an interfering transmission that included a first reference signal indicative of the first cell group identifier. Accordingly, the network controller communications manager 1410 may transmit to the first wireless device and based on receipt of the triggering message, a second cell group identifier representing a sub-group of the group of cells, the sub-group including the first cell.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1440 including instructions that, when executed, cause the processor to perform various functions described herein. In some cases, the memory 1430 may contain, among other things, a BIOS which may control basic hardware or software operation such as the interaction with peripheral components or devices.

The processor 1435 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1435 may be configured to operate a memory array using a memory controller. In other cases, a memory controller may be integrated into the processor 1435. The processor 1435 may be configured to execute computer-readable instructions stored in a memory (e.g., the memory 1430) to cause the device 1405 to perform various functions (e.g., functions or tasks supporting multi-step reference signal configuration and detection for interference management).

The code 1440 may include instructions to implement aspects of the present disclosure, including instructions to support wireless communications. The code 1440 may be stored in a non-transitory computer-readable medium such as system memory or other type of memory. In some cases, the code 1440 may not be directly executable by the processor 1435 but may cause a computer (e.g., when compiled and executed) to perform functions described herein.

Figure 15:
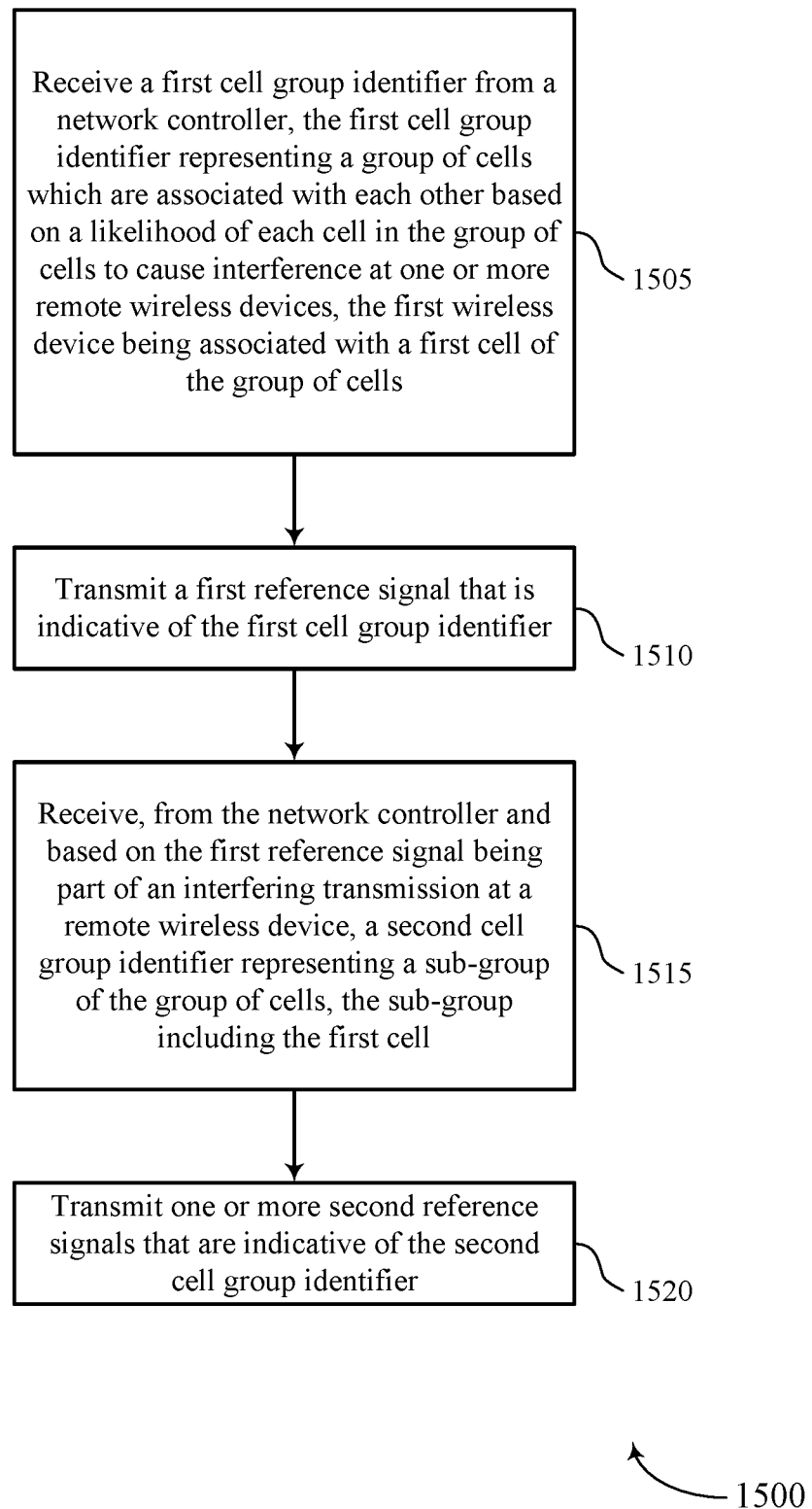
FIGS. 15 through 20 show flowcharts illustrating methods that support multi-step reference signal configuration and detection for interference management in accordance with aspects of the present disclosure.

FIG. 15 shows a flowchart illustrating a method 1500 that supports multi-step reference signal configuration and detection for interference management in accordance with aspects of the present disclosure. The operations of method 1500 may be implemented by a base station 105 or its components as described herein when the base station 105 is acting as an aggressor wireless device. For example, the operations of method 1500 may be performed by a base station communications manager as described with reference to FIGS. 7 through 10. In some examples, a base station may execute a set of instructions to control the functional elements of the base station to perform the functions described herein. Additionally or alternatively, a base station may perform aspects of the functions described herein using special-purpose hardware.

At 1505, the base station may receive a first cell group identifier from a network controller, the first cell group identifier representing a group of cells which are associated with each other based on a likelihood of each cell in the group of cells to cause interference at one or more remote wireless devices, the first wireless device being associated with a first cell of the group of cells. The operations of 1505 may be performed according to the methods described herein. In some examples, aspects of the operations of 1505 may be performed by a cell group receiver as described with reference to FIGS. 7 through 10.

At 1510, the base station may transmit a first reference signal that is indicative of the first cell group identifier. The operations of 1510 may be performed according to the methods described herein. In some examples, aspects of the operations of 1510 may be performed by an aggressor reference signal transmitter as described with reference to FIGS. 7 through 10.

At 1515, the base station may receive, from the network controller and based on the first reference signal being part of an interfering transmission at a remote wireless device, a second cell group identifier representing a sub-group of the group of cells, the sub-group including the first cell. The operations of 1515 may be performed according to the methods described herein. In some examples, aspects of the operations of 1515 may be performed by a cell sub-group aggressor receiver as described with reference to FIGS. 7 through 10.

At 1520, the base station may transmit one or more second reference signals that are indicative of the second cell group identifier. The operations of 1520 may be performed according to the methods described herein. In some examples, aspects of the operations of 1520 may be performed by an aggressor sub-group reference signal transmitter as described with reference to FIGS. 7 through 10.

Figure 16:
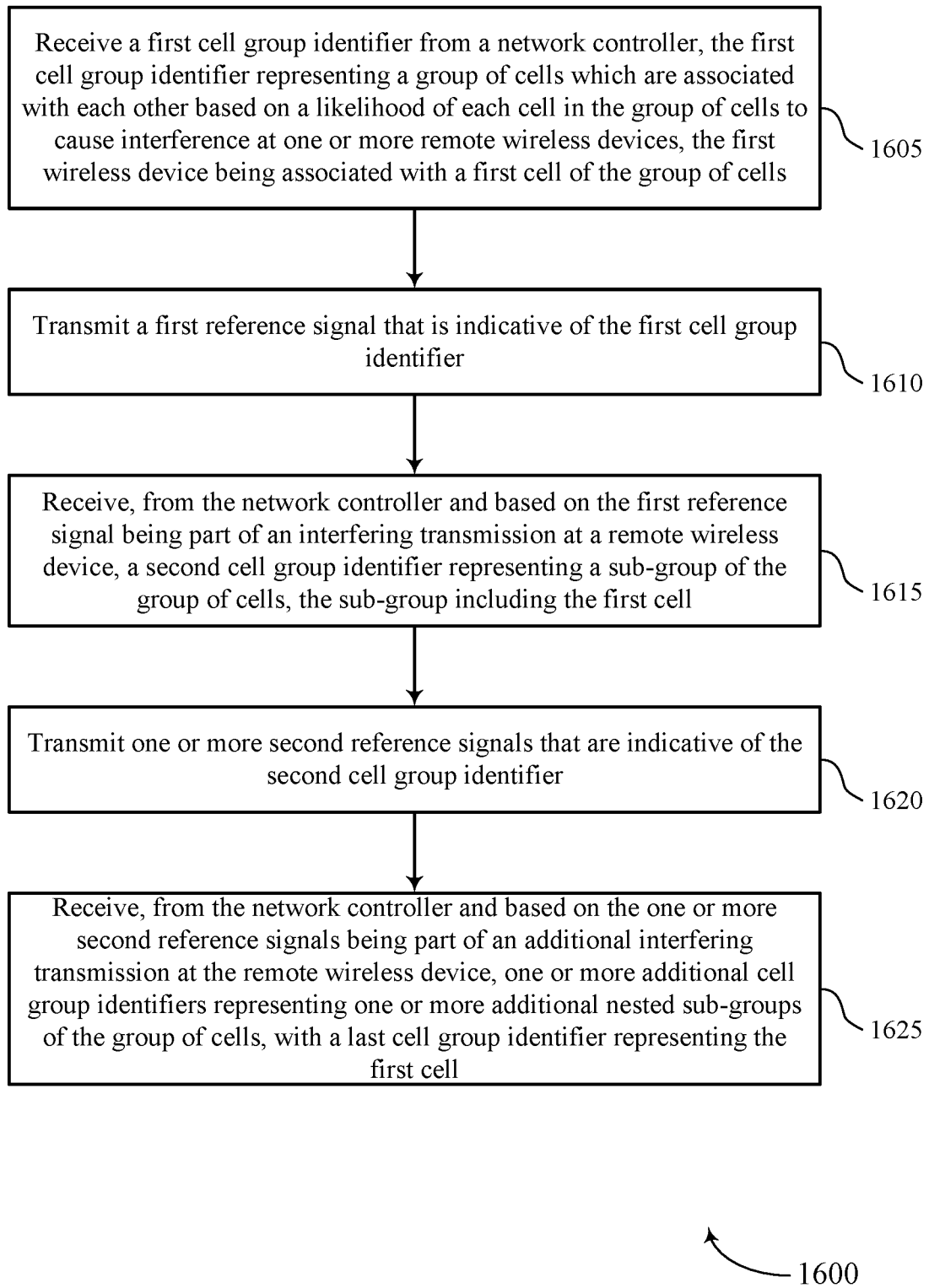

FIG. 16 shows a flowchart illustrating a method 1600 that supports multi-step reference signal configuration and detection for interference management in accordance with aspects of the present disclosure. The operations of method 1600 may be implemented by a base station 105 or its components as described herein when the base station 105 is acting as an aggressor wireless device. For example, the operations of method 1600 may be performed by a base station communications manager as described with reference to FIGS. 7 through 10. In some examples, a base station may execute a set of instructions to control the functional elements of the base station to perform the functions described herein. Additionally or alternatively, a base station may perform aspects of the functions described herein using special-purpose hardware.

At 1605, the base station may receive a first cell group identifier from a network controller, the first cell group identifier representing a group of cells which are associated with each other based on a likelihood of each cell in the group of cells to cause interference at one or more remote wireless devices, the first wireless device being associated with a first cell of the group of cells. The operations of 1605 may be performed according to the methods described herein. In some examples, aspects of the operations of 1605 may be performed by a cell group receiver as described with reference to FIGS. 7 through 10.

At 1610, the base station may transmit a first reference signal that is indicative of the first cell group identifier. The operations of 1610 may be performed according to the methods described herein. In some examples, aspects of the operations of 1610 may be performed by an aggressor reference signal transmitter as described with reference to FIGS. 7 through 10.

At 1615, the base station may receive, from the network controller and based on the first reference signal being part of an interfering transmission at a remote wireless device, a second cell group identifier representing a sub-group of the group of cells, the sub-group including the first cell. The operations of 1615 may be performed according to the methods described herein. In some examples, aspects of the operations of 1615 may be performed by a cell sub-group aggressor receiver as described with reference to FIGS. 7 through 10.

At 1620, the base station may transmit one or more second reference signals that are indicative of the second cell group identifier. The operations of 1620 may be performed according to the methods described herein. In some examples, aspects of the operations of 1620 may be performed by an aggressor sub-group reference signal transmitter as described with reference to FIGS. 7 through 10.

At 1625, the base station may receive, from the network controller and based on the one or more second reference signals being part of an additional interfering transmission at the remote wireless device, one or more additional cell group identifiers representing one or more additional nested sub-groups of the group of cells, with a last cell group identifier representing the first cell. The operations of 1625 may be performed according to the methods described herein. In some examples, aspects of the operations of 1625 may be performed by a multi-step cell sub-group aggressor receiver as described with reference to FIGS. 7 through 10.

Figure 17:
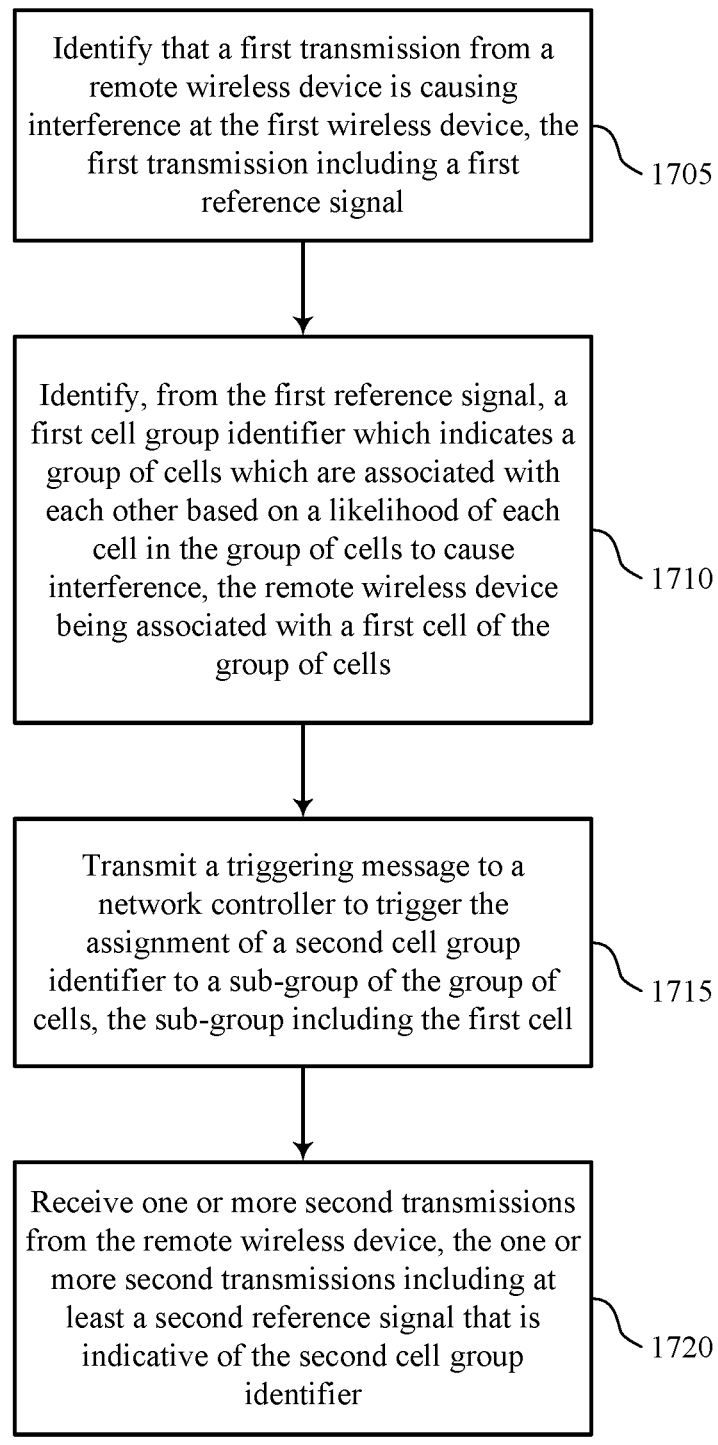

FIG. 17 shows a flowchart illustrating a method 1700 that supports multi-step reference signal configuration and detection for interference management in accordance with aspects of the present disclosure. The operations of method 1700 may be implemented by a base station 105 or its components as described herein when the base station 105 is acting as a victim wireless device. For example, the operations of method 1700 may be performed by a base station communications manager as described with reference to FIGS. 7 through 10. In some examples, a base station may execute a set of instructions to control the functional elements of the base station to perform the functions described herein. Additionally or alternatively, a base station may perform aspects of the functions described herein using special-purpose hardware.

At 1705, the base station may identify that a first transmission from a remote wireless device is causing interference at the first wireless device, the first transmission including a first reference signal. The operations of 1705 may be performed according to the methods described herein. In some examples, aspects of the operations of 1705 may be performed by an interference identifier as described with reference to FIGS. 7 through 10.

At 1710, the base station may identify, from the first reference signal, a first cell group identifier which indicates a group of cells which are associated with each other based on a likelihood of each cell in the group of cells to cause interference, the remote wireless device being associated with a first cell of the group of cells. The operations of 1710 may be performed according to the methods described herein. In some examples, aspects of the operations of 1710 may be performed by a cell group identifier as described with reference to FIGS. 7 through 10.

At 1715, the base station may transmit a triggering message to a network controller to trigger the assignment of a second cell group identifier to a sub-group of the group of cells, the sub-group including the first cell. The operations of 1715 may be performed according to the methods described herein. In some examples, aspects of the operations of 1715 may be performed by a triggering message transmitter as described with reference to FIGS. 7 through 10.

At 1720, the base station may receive one or more second transmissions from the remote wireless device, the one or more second transmissions including at least a second reference signal that is indicative of the second cell group identifier. The operations of 1720 may be performed according to the methods described herein. In some examples, aspects of the operations of 1720 may be performed by a cell sub-group victim receiver as described with reference to FIGS. 7 through 10.

Figure 18:
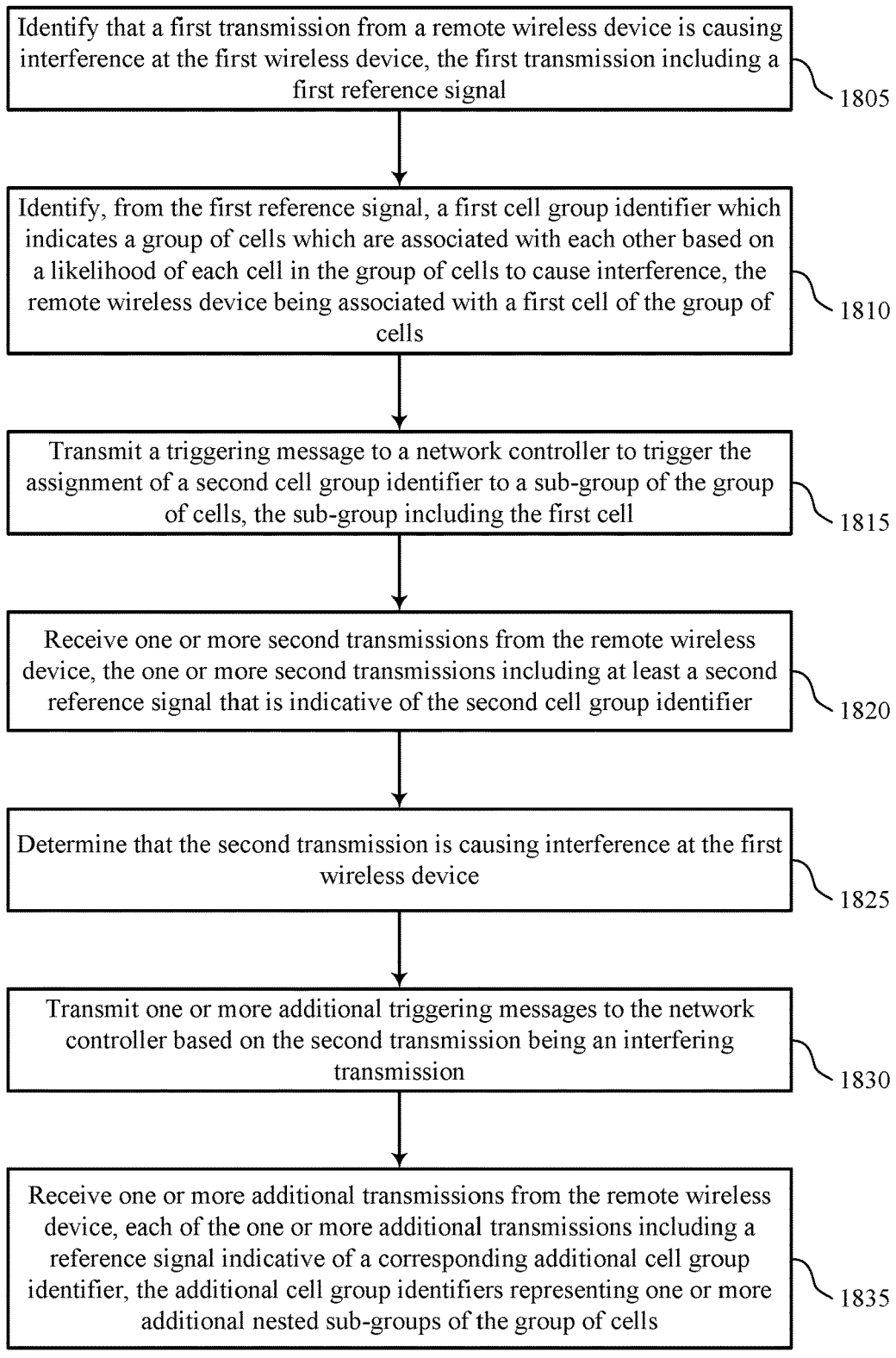

FIG. 18 shows a flowchart illustrating a method 1800 that supports multi-step reference signal configuration and detection for interference management in accordance with aspects of the present disclosure. The operations of method 1800 may be implemented by a base station 105 or its components as described herein when the base station 105 is acting as a victim wireless device. For example, the operations of method 1800 may be performed by a base station communications manager as described with reference to FIGS. 7 through 10. In some examples, a base station may execute a set of instructions to control the functional elements of the base station to perform the functions described herein. Additionally or alternatively, a base station may perform aspects of the functions described herein using special-purpose hardware.

At 1805, the base station may identify that a first transmission from a remote wireless device is causing interference at the first wireless device, the first transmission including a first reference signal. The operations of 1805 may be performed according to the methods described herein. In some examples, aspects of the operations of 1805 may be performed by an interference identifier as described with reference to FIGS. 7 through 10.

At 1810, the base station may identify, from the first reference signal, a first cell group identifier which indicates a group of cells which are associated with each other based on a likelihood of each cell in the group of cells to cause interference, the remote wireless device being associated with a first cell of the group of cells. The operations of 1810 may be performed according to the methods described herein. In some examples, aspects of the operations of 1810 may be performed by a cell group identifier as described with reference to FIGS. 7 through 10.

At 1815, the base station may transmit a triggering message to a network controller to trigger the assignment of a second cell group identifier to a sub-group of the group of cells, the sub-group including the first cell. The operations of 1815 may be performed according to the methods described herein. In some examples, aspects of the operations of 1815 may be performed by a triggering message transmitter as described with reference to FIGS. 7 through 10.

At 1820, the base station may receive one or more second transmissions from the remote wireless device, the one or more second transmissions including at least a second reference signal that is indicative of the second cell group identifier. The operations of 1820 may be performed according to the methods described herein. In some examples, aspects of the operations of 1820 may be performed by a cell sub-group victim receiver as described with reference to FIGS. 7 through 10.

At 1825, the base station may determine that the one or more second transmissions are causing interference at the first wireless device. The operations of 1825 may be performed according to the methods described herein. In some examples, aspects of the operations of 1825 may be performed by an interference identifier as described with reference to FIGS. 7 through 10.

At 1830, the base station may transmit one or more additional triggering messages to the network controller based on the second transmission being an interfering transmission. The operations of 1830 may be performed according to the methods described herein. In some examples, aspects of the operations of 1830 may be performed by a multi-step trigger transmitter as described with reference to FIGS. 7 through 10.

At 1835, the base station may receive one or more additional transmissions from the remote wireless device, each of the one or more additional transmissions including a reference signal indicative of a corresponding additional cell group identifier, the additional cell group identifiers representing one or more additional nested sub-groups of the group of cells. The operations of 1835 may be performed according to the methods described herein. In some examples, aspects of the operations of 1835 may be performed by a multi-step cell sub-group victim receiver as described with reference to FIGS. 7 through 10.

Figure 19:
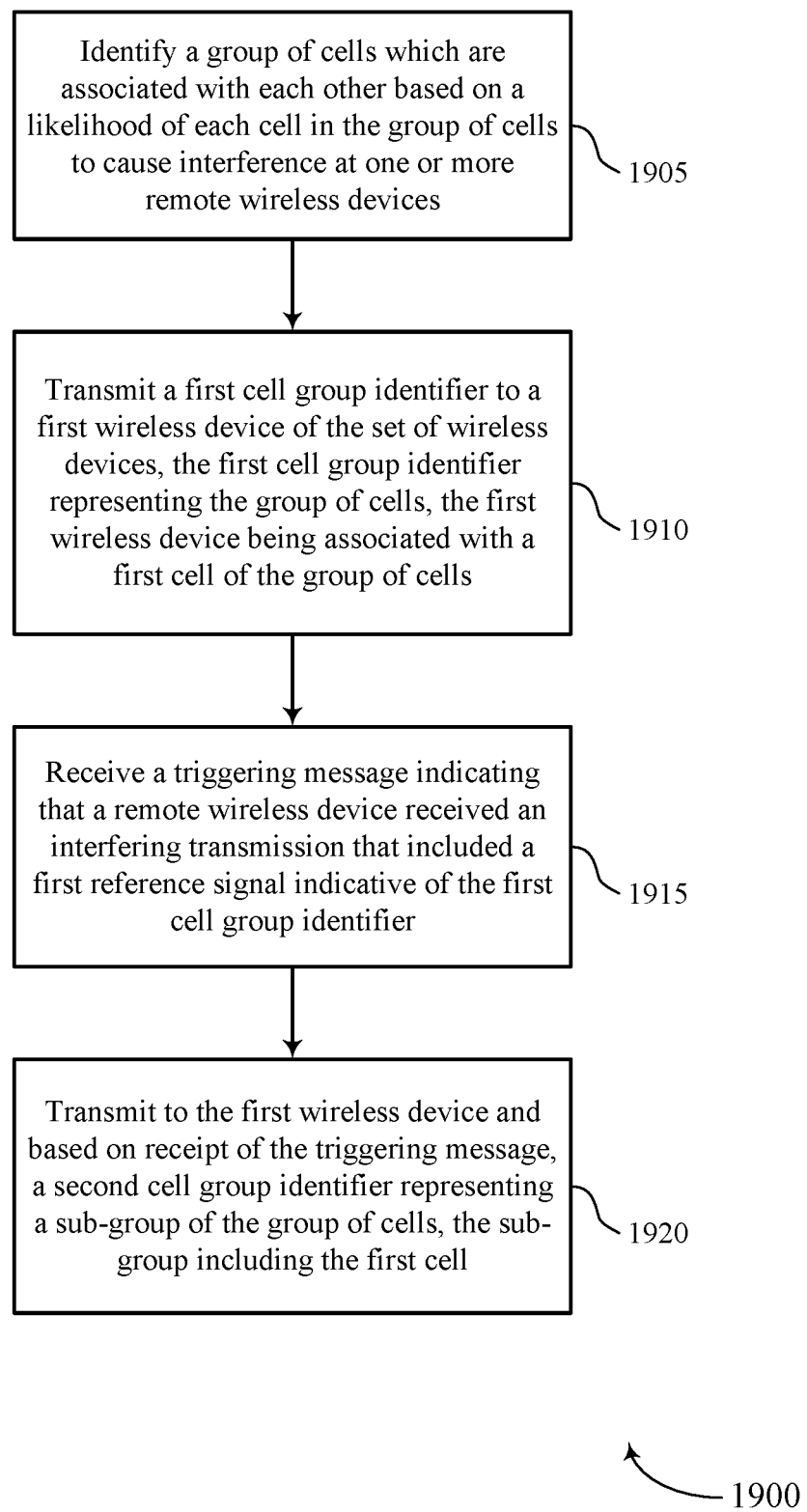

FIG. 19 shows a flowchart illustrating a method 1900 that supports multi-step reference signal configuration and detection for interference management in accordance with aspects of the present disclosure. The operations of method 1900 may be implemented by a network entity, such as a network controller 305, or its components as described herein. For example, the operations of method 1900 may be performed by a network controller communications manager as described with reference to FIGS. 11 through 14. In some examples, a network entity may execute a set of instructions to control the functional elements of the network entity to perform the functions described herein. Additionally or alternatively, a network entity may perform aspects of the functions described herein using special-purpose hardware.

At 1905, the network entity may identify a group of cells which are associated with each other based on a likelihood of each cell in the group of cells to cause interference at one or more remote wireless devices (e.g., victim wireless devices). The operations of 1905 may be performed according to the methods described herein. In some examples, aspects of the operations of 1905 may be performed by a cell grouping component as described with reference to FIGS. 11 through 14.

At 1910, the network entity may transmit a first cell group identifier to a first wireless device (e.g., aggressor wireless device) of the set of wireless devices, the first cell group identifier representing the group of cells, the first wireless device being associated with a first cell of the group of cells. The operations of 1910 may be performed according to the methods described herein. In some examples, aspects of the operations of 1910 may be performed by a cell group transmitter as described with reference to FIGS. 11 through 14.

At 1915, the network entity may receive a triggering message indicating that a remote wireless device received an interfering transmission that included a first reference signal indicative of the first cell group identifier. The operations of 1915 may be performed according to the methods described herein. In some examples, aspects of the operations of 1915 may be performed by a triggering message receiver as described with reference to FIGS. 11 through 14.

At 1920, the network entity may transmit to the first wireless device and based on receipt of the triggering message, a second cell group identifier representing a sub-group of the group of cells, the sub-group including the first cell. The operations of 1920 may be performed according to the methods described herein. In some examples, aspects of the operations of 1920 may be performed by a cell sub-group transmitter as described with reference to FIGS. 11 through 14.

Figure 20:
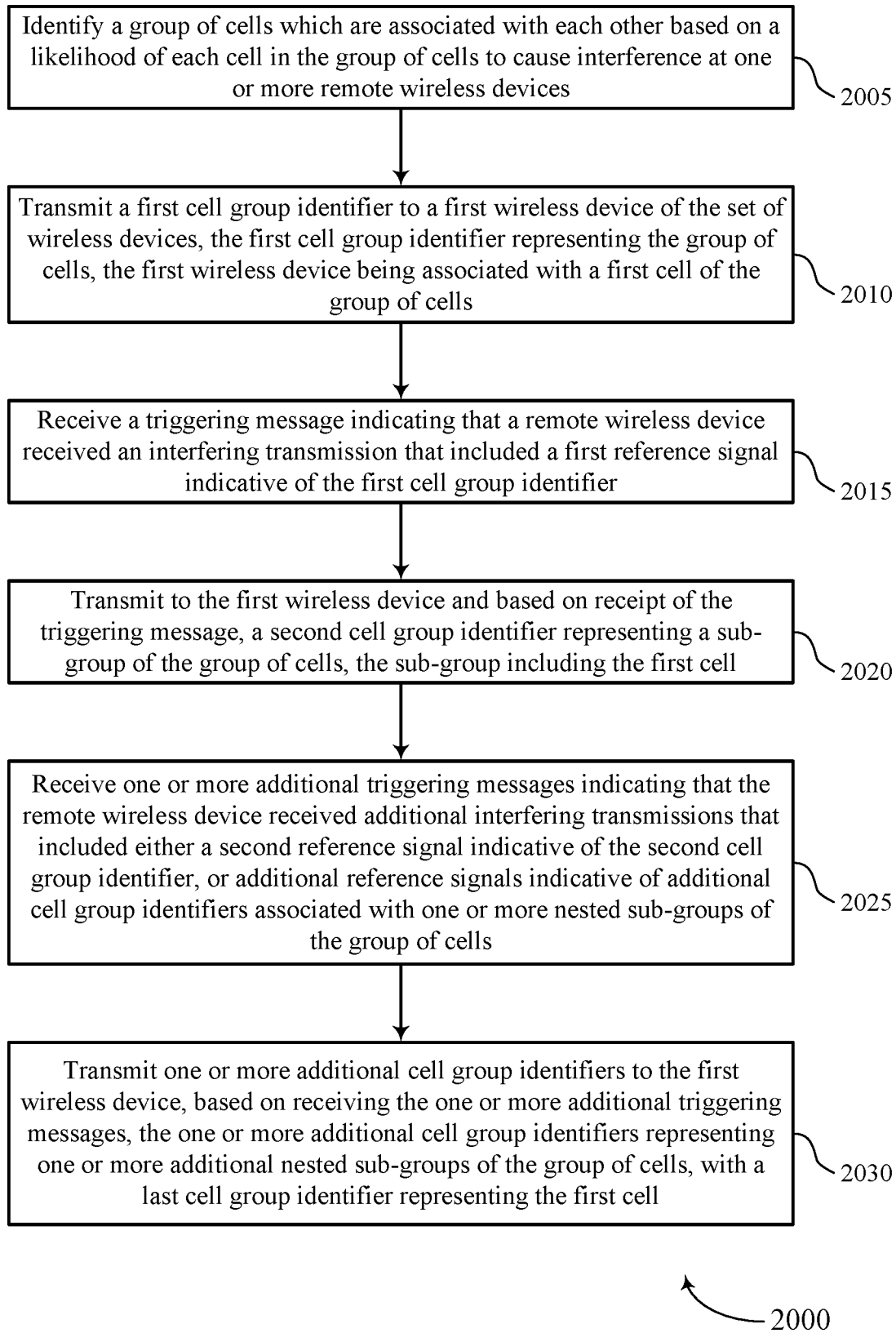

FIG. 20 shows a flowchart illustrating a method 2000 that supports multi-step reference signal configuration and detection for interference management in accordance with aspects of the present disclosure. The operations of method 2000 may be implemented by a network entity, such as a network controller 305, or its components as described herein. For example, the operations of method 2000 may be performed by a network controller communications manager as described with reference to FIGS. 11 through 14. In some examples, a network entity may execute a set of instructions to control the functional elements of the network entity to perform the functions described herein. Additionally or alternatively, a network entity may perform aspects of the functions described herein using special-purpose hardware.

At 2005, the network entity may identify a group of cells which are associated with each other based on a likelihood of each cell in the group of cells to cause interference at one or more remote wireless devices (e.g., victim wireless devices). The operations of 2005 may be performed according to the methods described herein. In some examples, aspects of the operations of 2005 may be performed by a cell grouping component as described with reference to FIGS. 11 through 14.

At 2010, the network entity may transmit a first cell group identifier to a first wireless device (e.g., aggressor wireless device) of the set of wireless devices, the first cell group identifier representing the group of cells, the first wireless device being associated with a first cell of the group of cells. The operations of 2010 may be performed according to the methods described herein. In some examples, aspects of the operations of 2010 may be performed by a cell group transmitter as described with reference to FIGS. 11 through 14.

At 2015, the network entity may receive a triggering message indicating that a remote wireless device received an interfering transmission that included a first reference signal indicative of the first cell group identifier. The operations of 2015 may be performed according to the methods described herein. In some examples, aspects of the operations of 2015 may be performed by a triggering message receiver as described with reference to FIGS. 11 through 14.

At 2020, the network entity may transmit to the first wireless device and based on receipt of the triggering message, a second cell group identifier representing a sub-group of the group of cells, the sub-group including the first cell. The operations of 2020 may be performed according to the methods described herein. In some examples, aspects of the operations of 2020 may be performed by a cell sub-group transmitter as described with reference to FIGS. 11 through 14.

At 2025, the network entity may receive one or more additional triggering messages indicating that the remote wireless device received additional interfering transmissions that included either a second reference signal indicative of the second cell group identifier, or additional reference signals indicative of additional cell group identifiers associated with one or more nested sub-groups of the group of cells. The operations of 2025 may be performed according to the methods described herein. In some examples, aspects of the operations of 2025 may be performed by a multi-step trigger receiver as described with reference to FIGS. 11 through 14.

At 2030, the network entity may transmit one or more additional cell group identifiers to the first wireless device, based on receiving the one or more additional triggering messages, the one or more additional cell group identifiers representing one or more additional nested sub-groups of the group of cells, with a last cell group identifier representing the first cell. The operations of 2030 may be performed according to the methods described herein. In some examples, aspects of the operations of 2030 may be performed by a multi-step cell sub-group transmitter as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device operating in a time division duplex (TDD) system, comprising:
   receiving a first cell group identifier from a network controller, the first cell group identifier representing a group of cells which are associated with each other based at least in part on a likelihood of each cell in the group of cells to cause interference at one or more remote wireless devices, the first wireless device being associated with a first cell of the group of cells;
   transmitting a first reference signal that is indicative of the first cell group identifier;
   receiving, from the network controller and based at least in part on the first reference signal being part of an interfering transmission at a remote wireless device, a second cell group identifier representing a sub-group of the group of cells, the sub-group including the first cell; and
   transmitting one or more reference signals that are indicative of the second cell group identifier.

2. The method of claim 1, further comprising:
   receiving, from the network controller and based at least in part on the one or more reference signals being part of an additional interfering transmission at the remote wireless device, one or more additional cell group identifiers representing one or more additional nested sub-groups of the group of cells, with a last cell group identifier representing the first cell.

3. The method of claim 1, wherein the sub-group includes only the first cell.

4. The method of claim 1, wherein transmitting the first reference signal comprises:
   including the first cell group identifier in the first reference signal as an explicit indication.

5. The method of claim 1, wherein transmitting the first reference signal comprises:
   including the first cell group identifier in the first reference signal as an implicit indication.

6. The method of claim 5, wherein the implicit indication is through association of one or more reference signal patterns with the first cell group identifier.

7. The method of claim 1, wherein transmitting the first reference signal comprises:
   including the first cell group identifier in the first reference signal through a combination of explicit and implicit indications.

8. The method of claim 1, wherein cells of the group of cells are associated with each other based on a likelihood of each cell in the group of cells to cause interference, by downlink transmission, to reception of uplink transmissions at the one or more remote wireless devices.

9. The method of claim 1, wherein cells of the group of cells are associated with each other based on a likelihood of each cell in the group of cells to cause cross-link interference with the one or more remote wireless devices.

10. The method of claim 1, wherein the second cell group identifier is unique among other cell group identifiers associated with other sub-groups of the group of cells.

11. The method of claim 1, wherein the second cell group identifier is unique among other cell group identifiers associated with other sub-groups at a same sub-group level within the group of cells.

12. The method of claim 1, wherein the second cell group identifier is unique among other cell group identifiers associated with other sub-groups at any sub-group level within the group of cells.

13. A method for wireless communication at a first wireless device operating in a time division duplex (TDD) system, comprising:
   identifying that a first transmission from a remote wireless device is causing interference at the first wireless device, the first transmission including a first reference signal;
   identifying, from the first reference signal, a first cell group identifier which indicates a group of cells which are associated with each other based at least in part on a likelihood of each cell in the group of cells to cause interference, the remote wireless device being associated with a first cell of the group of cells;
   transmitting a triggering message to a network controller to trigger the assignment of a second cell group identifier to a sub-group of the group of cells, the sub-group including the first cell; and
   receiving one or more transmissions from the remote wireless device, the one or more transmissions including at least a second reference signal that is indicative of the second cell group identifier.

14. The method of claim 13, further comprising:
   determining that the one or more transmissions are causing interference at the first wireless device;
   transmitting one or more additional triggering messages to the network controller based at least in part on the second transmission being an interfering transmission; and receiving one or more additional transmissions from the remote wireless device, each of the one or more additional transmissions including a reference signal indicative of a corresponding additional cell group identifier, the additional cell group identifiers representing one or more additional nested sub-groups of the group of cells.

15. The method of claim 14, wherein a last cell group identifier associated with a last reference signal represents the first cell.

16. The method of claim 13, wherein the sub-group includes only the first cell.

17. The method of claim 13, wherein identifying the first cell group identifier comprises:
receiving the first cell group identifier as an explicit indication in the first reference signal.

18. The method of claim 13, wherein identifying the first cell group identifier comprises:
determining the first cell group identifier from an implicit indication of the first reference signal.

19. The method of claim 18, wherein the implicit indication is through association of one or more reference signal patterns with the first cell group identifier.

20. The method of claim 13, wherein identifying the first cell group identifier comprises:
determining the first cell group identifier through a combination of explicit and implicit indications in the first reference signal.

21. The method of claim 13, wherein cells of the group of cells are associated with each other based on a likelihood of each cell in the group of cells to cause interference, by downlink transmission, to reception of uplink transmissions at the first wireless device.

22. The method of claim 13, wherein cells of the group of cells are associated with each other based on a likelihood of each cell in the group of cells to cause cross-link interference with the first wireless device.

23. The method of claim 13, wherein the second cell group identifier is unique among other cell group identifiers associated with other sub-groups of the group of cells.

24. The method of claim 13, wherein the second cell group identifier is unique among other cell group identifiers associated with other sub-groups at a same sub-group level within the group of cells.

25. The method of claim 13, wherein the second cell group identifier is unique among other cell group identifiers associated with other sub-groups at any sub-group level within the group of cells.

26. An apparatus for wireless communication at a first wireless device operating in a time division duplex (TDD) system, comprising:
a processor,
memory in electronic communication with the processor; and
instructions stored in the memory and executable by the processor to cause the apparatus to:
receive a first cell group identifier from a network controller, the first cell group identifier representing a group of cells which are associated with each other based at least in part on a likelihood of each cell in the group of cells to cause interference at one or more remote wireless devices, the first wireless device being associated with a first cell of the group of cells;
transmit a first reference signal that is indicative of the first cell group identifier;
receive, from the network controller and based at least in part on the first reference signal being part of an interfering transmission at a remote wireless device, a second cell group identifier representing a sub-group of the group of cells, the sub-group including the first cell; and
transmit one or more second reference signals that are indicative of the second cell group identifier.

27. The apparatus of claim 26, wherein the instructions are further executable by the processor to cause the apparatus to:
receive, from the network controller and based at least in part on the one or more second reference signal being part of an additional interfering transmission at the remote wireless device, one or more additional cell group identifiers representing one or more additional nested sub-groups of the group of cells, with a last cell group identifier representing the first cell.

28. The apparatus of claim 26, wherein the instructions to transmit the first reference signal are executable by the processor to cause the apparatus to:
include the first cell group identifier in the first reference signal as an explicit indication, an implicit indication, or a combination of the explicit indication and the implicit indication.

29. An apparatus for wireless communication at a first wireless device operating in a time division duplex (TDD) system, comprising:
a processor,
memory in electronic communication with the processor; and
instructions stored in the memory and executable by the processor to cause the apparatus to:
identify that a first transmission from a remote wireless device is causing interference at the first wireless device, the first transmission including a first reference signal;
identify, from the first reference signal, a first cell group identifier which indicates a group of cells which are associated with each other based at least in part on a likelihood of each cell in the group of cells to cause interference, the remote wireless device being associated with a first cell of the group of cells;
transmit a triggering message to a network controller to trigger the assignment of a second cell group identifier to a sub-group of the group of cells, the sub-group including the first cell; and
receive one or more second transmissions from the remote wireless device, the one or more second transmissions including at least a second reference signal that is indicative of the second cell group identifier.

30. The apparatus of claim 29, wherein the instructions are further executable by the processor to cause the apparatus to:
determine that the one or more second transmissions are causing interference at the first wireless device;
transmit one or more additional triggering messages to the network controller based at least in part on the second transmission being an interfering transmission; and
receive one or more additional transmissions from the remote wireless device, each of the one or more additional transmissions including a reference signal indicative of a corresponding additional cell group identifier, the additional cell group identifiers representing one or more additional nested sub-groups of the group of cells.

\* \* \* \* \*